(12) United States Patent
Ansari et al.

(10) Patent No.: US 8,205,240 B2
(45) Date of Patent: Jun. 19, 2012

(54) ACTIVATION, INITIALIZATION, AUTHENTICATION, AND AUTHORIZATION FOR A MULTI-SERVICES GATEWAY DEVICE AT USER PREMISES

(75) Inventors: Amir Ansari, Plano, TX (US); George A. Cowgill, Farmersville, TX (US); Ramprakash Masina, Wylie, TX (US); Jude P. Ramayya, Wylie, TX (US); Alvin R. McQuarters, Euless, TX (US); Atousa Raissyan, Potomac, MD (US); Leon E. Nicholls, Plano, TX (US); Wesley R. Erhart, McKinney, TX (US); Michael P. Cooper, Plano, TX (US)

(73) Assignee: Prodea Systems, Inc, Plano, TX (US)

( * ) Notice: Subject to any disclaimer, the term of this patent is extended or adjusted under 35 U.S.C. 154(b) by 973 days.

(21) Appl. No.: 11/966,884

(22) Filed: Dec. 28, 2007

(65) Prior Publication Data

US 2008/0189774 A1 Aug. 7, 2008

Related U.S. Application Data

(60) Provisional application No. 60/882,865, filed on Dec. 29, 2006, provisional application No. 60/882,862, filed on Dec. 29, 2006.

(51) Int. Cl.
*G06F 21/00* (2006.01)

(52) U.S. Cl. ............. 726/1; 726/2; 726/3; 726/4; 726/5; 726/6; 726/7; 726/8; 726/27; 726/28; 726/29; 726/30; 713/168; 713/169; 713/170; 713/171; 713/172; 709/225; 709/229

(58) Field of Classification Search .................. 726/1–8, 726/27–30; 709/229; 713/168–172
See application file for complete search history.

(56) References Cited

U.S. PATENT DOCUMENTS 5,878,223 A 3/1999 Becker et al.
(Continued)

FOREIGN PATENT DOCUMENTS

EP 1113659 A 7/2001
(Continued)

OTHER PUBLICATIONS

PCT Invitation to Pay Additional Fees and, Where Applicable, Protest Fee (PCT/ISA/206), and Communication Relating to the Results of the Partial International Search (Annex to PCT/ISA206) dated May 19, 2008 for PCT Application No. PCT/US2007/089237, 7 pages.

(Continued)

*Primary Examiner* — Thanhnga B Truong
*Assistant Examiner* — Josnel Jeudy
(74) *Attorney, Agent, or Firm* — Haynes and Boone, LLP

(57) ABSTRACT

A method of putting a first gateway device into service, the first gateway device having an application service module and a network module enabling communications between the first gateway device and the activation manager, the application service module residing on a user premises side of a network service provider demarcation. The method comprises identifying, at the first gateway device disposed at a user premises, an activation manager in communication with the first gateway device, transmitting, from the first gateway device, an activation certificate to the activation manager for verification and authentication, generating a service authentication key associated with the first gateway device, storing the service authentication key and an indication that the associated gateway device status is activated in a database, determining the services available to the first gateway device, and transmitting the service authentication key and an identification of the available services to the first gateway device.

42 Claims, 9 Drawing Sheets

U.S. PATENT DOCUMENTS

| | | | |
|---|---|---|---|
| 6,016,520 A | 1/2000 | Facq et al. | |
| 6,055,569 A | 4/2000 | O'Brien et al. | |
| 6,426,955 B1 | 7/2002 | Dalton, Jr. et al. | |
| 6,622,168 B1 | 9/2003 | Datta | |
| 6,871,193 B1 | 3/2005 | Campbell et al. | |
| 6,889,321 B1 | 5/2005 | Kung et al. | |
| 7,349,993 B2 * | 3/2008 | Kawamoto et al. | 709/249 |
| 7,574,660 B2 * | 8/2009 | Campbell et al. | 715/741 |
| 7,596,692 B2 * | 9/2009 | Fox et al. | 713/155 |
| 7,987,490 B2 | 7/2011 | Ansari et al. | |
| 2001/0051996 A1 * | 12/2001 | Cooper et al. | 709/217 |
| 2002/0184620 A1 | 12/2002 | Davies et al. | |
| 2003/0169752 A1 | 9/2003 | Chen et al. | |
| 2003/0237004 A1 * | 12/2003 | Okamura | 713/201 |
| 2004/0073867 A1 | 4/2004 | Kausik et al. | |
| 2004/0078573 A1 * | 4/2004 | Matsuyama | 713/175 |
| 2004/0133657 A1 | 7/2004 | Smith et al. | |
| 2005/0076198 A1 | 4/2005 | Skomra et al. | |
| 2005/0216949 A1 | 9/2005 | Candelora et al. | |
| 2005/0257039 A1 | 11/2005 | Marshall | |
| 2006/0029064 A1 | 2/2006 | Rao et al. | |
| 2006/0031476 A1 | 2/2006 | Mathes et al. | |
| 2006/0291506 A1 | 12/2006 | Cain | |
| 2008/0165789 A1 | 7/2008 | Ansari et al. | |
| 2009/0037382 A1 | 2/2009 | Ansari et al. | |
| 2009/0067441 A1 | 3/2009 | Ansari et al. | |
| 2009/0070229 A1 | 3/2009 | Ansari et al. | |
| 2009/0168787 A1 | 7/2009 | Ansari et al. | |
| 2010/0071053 A1 | 3/2010 | Ansari et al. | |
| 2010/0202450 A1 | 8/2010 | Ansari et al. | |
| 2010/0205152 A1 | 8/2010 | Ansari et al. | |
| 2010/0205301 A1 | 8/2010 | Ansari et al. | |
| 2010/0217837 A1 | 8/2010 | Ansari et al. | |
| 2010/0231790 A1 | 9/2010 | Ansari et al. | |
| 2010/0235433 A1 | 9/2010 | Ansari et al. | |
| 2010/0241711 A1 | 9/2010 | Ansari et al. | |
| 2010/0241748 A1 | 9/2010 | Ansari et al. | |

FOREIGN PATENT DOCUMENTS

| | | |
|---|---|---|
| EP | 1 394 986 | 3/2004 |
| WO | WO 0193533 A2 | 12/2001 |
| WO | WO 2007/004921 A1 | 1/2007 |
| WO | 2008021665 A2 | 2/2008 |
| WO | WO-2008/082441 | 7/2008 |
| WO | WO-2008/083384 | 7/2008 |
| WO | WO-2008/083385 | 7/2008 |
| WO | WO-2008/083387 | 7/2008 |
| WO | WO-2008/083391 | 7/2008 |
| WO | WO-2008/085201 | 7/2008 |
| WO | WO-2008/085202 | 7/2008 |
| WO | WO-2008/085203 | 7/2008 |
| WO | WO-2008/085204 | 7/2008 |
| WO | WO-2008/085205 | 7/2008 |
| WO | WO-2008/085206 | 7/2008 |
| WO | WO-2008/085207 | 7/2008 |
| WO | WO-2009/036088 | 3/2009 |
| WO | WO-2009/036185 | 3/2009 |
| WO | WO-2009/086134 | 7/2009 |

OTHER PUBLICATIONS

PCT Invitation to Pay Additional Fees and, Where Applicable, Protest Fee (PCT/ISA/206), and Communication Relating to the Results of the Partial International Search (Annex to PCT/ISA206) dated May 21, 2008 for PCT Application No. PCT/US2007/089227, 7 pages.

Yeon-Joo Oh, et al., "Design of a SIP-based Real-time Visitor Conversation and Door Control Architecture using a Home Gateway", 2006 IEEE, Jan. 7, 2006, pp. 187-188.

Duenas JC et al., An end-to-end service provisioning scenario for the residential environment, IEEE Communications Magazine, Sep. 1, 2005, pp. 94-100, vol. 43, No. 9, IEEE Service Center, Piscataway, US.

Haerick W et al., Success in Home Service Deployment: Zero-Touch or Chaos?, British Telecommunications, Jul. 1, 2007, pp. 36-43, vol. 4, No. 3, London, GB.

Il-Woo Lee et al., A Proposed Platform & Performance Estimation of Digital-Home Service Delivery/Management Systems, Apr. 10, 2006, pp. 713-719, Information Technology: New Generations, 2006. ITNG 2006. Third International Conference on Las Vegas, NV, USA Apr. 10-12, 2006.

PCT Notification of Transmittal of the International Search Report and the Written Opinion of the International Searching Authority, or the Declaration dated Feb. 26, 2008, for PCT Application No. PCT/US07/19483, 11 pages.

PCT Notification of Transmittal of the International Search Report and the Written Opinion of the International Searching Authority, or the Declaration dated Mar. 14, 2008, for PCT Application No. PCT/US07/19533, 12 pages.

PCT International Searching Authority—European Patent Office, PCT Notification of Transmittal of the International Search Report and the Written Opinion of the International Searching Authority, or the Declaration, Aug. 27, 2008, 24 pages, Application No. PCT/US2007/089237.

PCT International Searching Authority—European Patent Office, PCT Notification of Transmittal of the International Search Report and the Written Opinion of the International Searching Authority, or the Declaration, Aug. 8, 2008, 22 pages, Application No. PCT/US2007/089227.

PCT International Searching Authority—European Patent Office, PCT Notification of Transmittal of the International Search Report and the Written Opinion of the International Searching Authority, or the Declaration mailed Oct. 22, 2008, 12 pages, Application No. PCT/US2007/089232.

Young-Gab Kim et al., A Service Bundle Authentication Mechanism in the OSGI Service Platform, Advanced Information Networking and Applications, 2004, AINA 2004. 18th International Conference on Fukuoka, Japan, Mar. 29-31, 2004, Piscataway, NJ, USA, IEEE, vol. 1, Mar. 29, 2004, pp. 420-425, XP010695453, ISBN: 978-0-7695-2051-3.

* cited by examiner

US 8,205,240 B2

ACTIVATION, INITIALIZATION, AUTHENTICATION, AND AUTHORIZATION FOR A MULTI-SERVICES GATEWAY DEVICE AT USER PREMISES

RELATED APPLICATIONS

This application claims the benefit of U.S. Provisional Application No. 60/882,865 Filed Dec. 29, 2006 entitled "A Multi-Services Application Gateway And System Employing The Same," and of U.S. Provisional Application No. 60/882,862 Filed Dec. 29, 2006 entitled "System And Method For Providing Network Support Services And Premise Gateway Support Infrastructure," the disclosures of which are incorporated herein by reference.

This application is related to co-pending applications U.S. patent application Ser. No. 11/966,936, filed Dec. 28, 2007, entitled "Billing, Alarm, Statistics and Log Information Handling In Multi-Services Gateway Device at User Premises," and to U.S. patent application Ser. No. 11/966,945, filed Dec. 28, 2007, entitled "System and Method to Acquire, Aggregate, Manage, and Distribute Media," and to PCT International Application No. PCT/US2007/019546, filed Sep. 7, 2007, entitled "Multi-Services Application Gateway," and to PCT International Application No. PCT/US2007/019544, filed Sep. 7, 2007, entitled "System and Method for Providing Network Support Services and Premises Gateway Support Infrastructure," and to PCT International Application No. PCT/US2007/019545, filed Sep. 7, 2007, entitled "Subscription Management of Applications and Services Provided Through User Premises Gateway Devices," and to PCT International Application No. PCT/US2007/019543, filed Sep. 7, 2007, entitled "Demarcation Between Service Provider and User in Multi-Services Gateway Device at User Premises," and to PCT International Application No. PCT/US07/019,5333, filed Sep. 7, 2007, entitled "Display Inserts, Overlays, and Graphical User Interfaces for Multimedia Systems," and to PCT International Application No. PCMS07/19534, filed Sep. 7, 2007, entitled "Presence Status Notification From Digital Endpoint Devices Through a Multi-Services Gateway Device at the User Premises," and to PCT International Application PCT/US2007/019483, filed Sep. 7, 2007, entitled "Managed File Backup and Restore at Remote Storage Locations Through Multi-Services Gateway Device at User Premises," and to PCT International Application No. PCT/US2007/019531, filed Sep. 7, 2007, entitled File Sharing Through Multi-Services Gateway Device at User Premises," the disclosures of which are incorporated herein by reference.

TECHNICAL FIELD

The present subject matter relates to the activation, initialization, authentication, and authorization of a gateway device disposed at a user premises, and deployed as the peripheral element of a system managed by a service management center under the control of a service provider, wherein the gateway device is associated with endpoint devices and/or other gateway devices within the system to deliver application services and to facilitate management of application services, where a demarcation is defined between resources of the gateway accessible to and managed by the service provider and service access by a user via an endpoint device.

BACKGROUND

The digital home is now becoming more complex with the myriad of new and emerging digital devices intended to address many user and consumer needs such as communication, entertainment, privacy, and security. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically-challenged user. Furthermore, with respect to Internet-based data, most of the content delivery solutions are provided to the digital home networks through availability of the "two-foot" interface (i.e. the PC). It is relatively cumbersome to bring this content to the "ten-foot" interface (e.g. the television).

SUMMARY

There exists a need for a system to simplify the delivery of services and applications and the overall management of services and applications available to the digital home or even the small enterprise. Such a system would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device. Thus, an unmet need exists for a device associated within a user's premises that has robust functionality but does not require sophisticated or inordinate attention from the service provider or the user to manage, provision, and utilize.

A method of putting a first gateway device into service, the first gateway device having an application service module and a network module enabling communications between the first gateway device and the activation manager, the application service module residing on a user premises side of a network service provider demarcation. The method comprises identifying, at the first gateway device disposed at a user premises, an activation manager in communication with the first gateway device, transmitting, from the first gateway device, an activation certificate to the activation manager for verification and authentication, generating a service authentication key associated with the first gateway device, storing the service authentication key and an indication that the associated gateway device status is activated in a database, determining the services available to the first gateway device, and transmitting the service authentication key and an identification of the available services to the first gateway device.

A gateway device for operation at a user premises has at least one endpoint device associated with the gateway device, where the gateway device is in communication with a remote service manager. The gateway device comprises a user module providing bi-directional communications with the at least one endpoint device, an application services module residing on a user premises side of a network service provider demarcation, a network module having the connection that enables bi-directional communications with the remote service manager, and a service manager operable to transmit an activation certificate to a remote activation manager for verification and authentication, and receive a service authentication key and an identification of available services to the gateway device from the activation manager.

A system comprises at least one remote service manager coupled to a network, at least one activation manager coupled to the network, the at least one activation manager being independent of the at least one remote service manager, at least one gateway device disposed at a user premises and in communication with the at least one remote service manager and the at least one activation manager via the network. The at least one gateway device comprises an application services module residing on a user premises side of a network service provider demarcation, a network module having the connection that enables bi-directional communications with the remote service manager, and a service manager operable to transmit an activation certificate to a remote activation manager for verification and authentication, and receive a service authentication key and an identification of available services to the gateway device from the activation manager.

A system comprises at least one remote service manager coupled to a network, at least one application service provider coupled to the network, at least one activation manager coupled to the network, at least one gateway device disposed at a user premises and in communication with the at least one remote service manager and the at least one activation manager via the network, the at least one gateway device being agnostic to the at least one remote service manager and the at least one application service provider. The at least one gateway device comprises an application services module residing on a user premises side of a network service provider demarcation, a network module having the connection that enables bi-directional communications with the remote service manager, and a service manager operable to transmit an activation certificate to a remote activation manager for verification and authentication, and receive a service authentication key and an identification of available services to the gateway device from the activation manager.

A method of peer-to-peer gateway device authentication comprises activating a first gateway device, transmitting, from the first gateway device, a request for a gateway authentication certificate to an activation manager, and issuing a gateway authentication certificate and transmitting the gateway authentication certificate to the first gateway device. The method further comprises transmitting the gateway authentication certificate from the first gateway device to a second gateway device to establish accessibility of resources associated with the second gateway device from the first gateway device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In practice, a customer typically subscribes to basic transport services from a network service provider (e.g., ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 and 3 of the Open Systems Interconnection (OSI) model. While network services and associated devices may operate minimally at those levels, they operate at those levels to support operations at OSI layers 1, 2 and 3. Many applications, however, involve higher level service logic for applications that view the network transport as simply a transport pipe. The current Internet applications delivery and management architecture, and many devices or management systems based on it, require a server with robust processing and storage capability to be located at the network operations center, not in the home. For Voice Over Internet Protocol (VoIP) type telephone service, for example, the VoIP service provider operates a session initiation protocol (SIP) server or the like, and each user has only client functionality. The network transport layers are transparent to the Internet Protocol (IP) packets containing the voice and related signaling data. The SIP server, however, controls the call set-up, tear-down, billing and the like for the voice call services. With such a legacy architecture, the major capabilities and functionalities connected with providing application services from the server throughout the network reside on the server and supporting elements, all of which are located in the network operations center of the network service provider.

Figure 1:
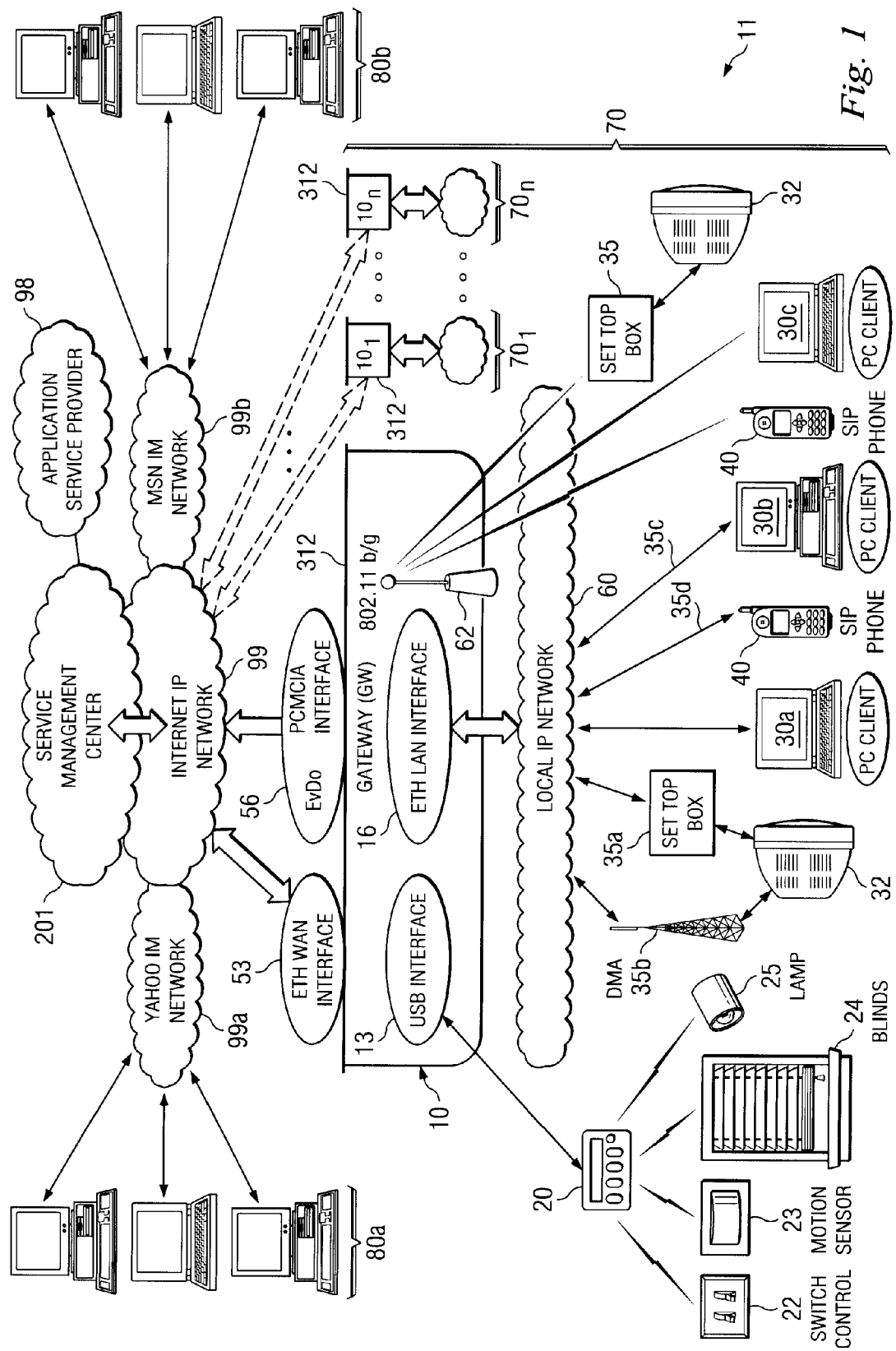
FIG. 1 is a network diagram of an embodiment of an exemplary system having a service management center connected to gateway devices that are connected to respective endpoint devices at the user premises.

FIG. 1 is a network diagram of an embodiment of an exemplary system having a service management center 201 connected to gateway devices 10 that are connected to respective endpoint devices 11 at the user premises. This secure platform for building and providing multiple application services for digital endpoints 11 associated with a gateway device 10 requires connectivity between the gateway device 10 and each of a user's endpoint devices 11. As shown in FIG. 1, this connectivity may be provided by network interfaces such as one or more USB interfaces 13, wired Local Area Network (LAN) connections such as provided by an Ethernet LAN interface 16, a wireless network interface via a WiFi LAN access point 62, other LAN transport technologies such as HPNA or HomePlugAV, or other technologies now available or hereafter developed. The WiFi connection may be implemented for example, in accordance with the I.E.E.E. 802.11b/g/n wireless network communications standard. These interfaces provide the required network interconnectivity for the endpoint devices 11 to connect to the gateway device 10 to access multiple application services residing on the gateway device 10. The connectivity between digital endpoint devices 11 and the gateway device 10 may be accomplished by other suitable means now known or to be developed, including, by way of example, through of a virtual private area network connection accessed through a WAN interface.

Exemplary endpoint devices 11, with which the gateway device 10 may communicate via the USB interface 13, include, for example, a home automation networking device 20 (e.g. X10, Z-Wave or ZigBee) for wired or wireless home network automation. The device 20 which in turn controls devices such as a switch controller 22, sensor devices 23, automatically-controlled window blinds 24, and a controlled lighting or lamp unit 25, for example. Furthermore, the gateway device 10 may communicate via the Ethernet LAN interface 16 across a local IP network 60 or via the WiFi LAN access point 62 to reach personal computing (PC) and laptop/mobile devices 30a, . . . , 30c that serve as file sources, control points and hosts for various other endpoint devices 11. In addition, the gateway device 10 may communicate via Ethernet LAN interface 16 across a local IP network 60 or via WiFi LAN access point 62 to access one or more television display devices 32 including the associated set top boxes (STB) 35a or digital media adapters (DMA) 35b. As further examples, one or more SIP phones (or VoIP phone devices) 40, or other devices that convert IP interfaces to Public Switched Telephone Network (PSTN) Foreign eXchange Office (FXO) and Foreign eXchange Subscriber (FXS) interfaces may be accessed by gateway device 10 via Ethernet LAN interface 16 across a local IP network 60 or via WiFi LAN access point 62. The endpoint devices 11 shown in FIG. 1 and the respective interfaces used by gateway device 10 to reach the endpoint devices 11 are not intended to be comprehensive and one skilled in the art can appreciate other endpoint devices 11 as well as other methods to allow gateway device 10 to communicate with potential endpoint devices 11 within this exemplary system.

As noted earlier, the gateway device 10 may access the DMA 35b for a television display device 32, which enables bidirectional wireline or wireless communication. The DMA 35b supports several functions for multiple services including, but not limited to: media (e.g., video and music) by enabling the transfer of media (e.g., video and music) to the TV; voice services, by providing for Calling Line Identification (CLID) and for voice mail control; and provide Home Automation Services including status and control of networked home automation devices. The DMA 35b converts audio and video (optionally) to a format suitable for a TV. In addition, the DMA 35b may be capable of receiving context-sensitive commands from a remote control device (not shown) and forwarding those commands to the gateway device 10. This enables the use of menus on the television display device 32 for controlling application services and various features functions thereof, as offered by the gateway device 10. Therefore, the combination of the gateway device 10, DMA 35, and the television display device 32 one is able to provide the following features including, but not limited to: display of media; media control functions, when enabled (FF, REW, STOP, PAUSE, etc); display of CLID; control of voicemail; picture viewing; control of home automation; and user functions for the gateway device 10.

A set top box 35a is in communication with the gateway device 10 via the wireless access point 62. The set top box 35a also may handle media format conversion (for example NTSC to ATSC television RF signals), digital decryption and other DRM (digital rights management) functions, Video On Demand Purchases, etc. The combination of the Set Top Box 35a with the television display device 32 may enable, by way of example, Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA 35b and the television display device 32 or by the set-top-box 35a and the television display device 32, the communications to and from the television display device 32 provide a user interface for interaction with the gateway device 10. The software/firmware of the gateway device 10 supports, among other things, a graphical user interface (GUI) via the television display device 32, sometimes referred to as the "ten-foot" interface.

The PCs 30a, . . . , 30c shown in FIG. 1 interface with the gateway device 10 and serve as, among other things, file sources, control points and hosts for various software clients. The gateway device 10 may access PC device 30b via Ethernet LAN interface 16 across a local IP network 60 or via WiFi LAN access point 62. The gateway device 10 accessing the PC may provide for the bidirectional moving of files, and status and control for the endpoint devices 11, including for example, status and control of networked home automation devices. In addition, using the PCs 30a, . . . , 30c, users may access the gateway device 10 for any number of reasons, such as for example, share files on the gateway device 10 with other endpoint devices 11, back-up or transfer files to the gateway device 10 or other endpoint devices 11 having storage capabilities; access personal page for notifications, receive RDF site summary (RSS) or Atom feeds, share photos, and receive voicemail messages. In addition to the Instant Messaging and SIP capabilities of the gateway device 10, as will be described in more detail below, PCs 30a, . . . , 30c may also serve as a host for IM and SIP soft phone clients and other endpoint devices 11. The client-server interaction of the PCs 30a, . . . , 30c with the gateway device 10 offers an alternative GUI for at least some of the services. The PC based GUI is sometimes referred to as the "two-foot" interface.

Although not shown in FIG. 1, other digital endpoint devices 11 for which connectivity may be established with the gateway device 10 include, but are not limited to, media player devices (audio, video, audio/video, with or without metadata), hi-fi audio equipment with media streaming capability, game stations, Internet radio devices, WiFi phones, WiFi or other wirelessly enabled digital cameras, facsimile machines, electronic picture frames, health monitors (sensor and monitoring devices) and devices now known or to be developed. In addition to endpoint devices coupled via the LAN and WAN, the endpoint devices may be directly coupled to the gateway device off the Internet or private IP networks.

Although based on a client-server architecture, the exemplary system disclosed in FIG. 1 moves substantial functions performed by the typical network server into the user premises 70 by incorporating those functions into a gateway device 10, but in a way that allows for the server functionality to be externally managed by a service management center 201, which may in turn be operated by a third-party application service provider 98. Moreover, the architecture of the exemplary system does not require identity of the provider/manufacturer of the gateway device, the service management center or the third-party application service provider. Thus, a gateway device may be manufactured under the control of one entity, for distribution to one or more service management entities (each of which operates its own service management center). The gateway device may then be activated with a particular service management center under the control of a particular system management entity. A system management entity may be the entity that determines the mix of application services to which the user subscribes, or this "retail" function for application services may be performed by one or more application service providers, one or more of whom the user may subscribe to depending on the mix of application services offered by each application service provider. The term "application service provider" is used herein to refer to various entities up and down the "supply chain" and include, but are not limited to, manufacturers of the gateway device and endpoint devices, suppliers of the gateway device and endpoint devices, entities that provide, operate or manage application services, network service providers (described above), and entities that provide the activation manager function described in detail below. These entities in the supply chain may or may not operate or function independently of one another. Hereinafter, the term "remote service manager" is also used to refer to the service management center 201 and/or application service provider 98.

The server functionality residing in the gateway device 10 is not only located in the user premises 70 but it now resides on the user premises side of the traditional network service provider demarcation 312. The exemplary system shown in FIG. 1 does not just move server functionality from the servers in a traditional network operations center, where they were previously located, to the home; but it also moves the logical position of the execution of application services logic of the server to the user premises 70 side of the network service provider demarcation 312 and provides logical hooks to enable the external service manager to perform its function(s) on that side of the demarcation. For example, application service logic transmitted by application service provider 98 related to the use of one or more gateway devices 10 and/or endpoint devices 11 can now be provisioned, serviced and managed on the user premises 70 side of the network service provider demarcation 312, albeit by an external service management center 201 operated by or on behalf of a third-party application service provider 98. The application software architecture, coupled with the specific managed hardware implementation at the user premises 70, enables a single service provider to provide the network services such as IP network 99, whereas one or more application services providers 98 (possibly including the network service provider) can provide the applications services to the customer independently of providing the network service.

By distributing the application services to the user premises 70, but retaining a central management feature through the service management center 201 and the application service provider(s) 98, the disclosed exemplary system in FIG. 1 addresses network computing and traffic capacity and latency challenges of providing application services at the network level. The exemplary architecture thus results in significantly reduced latency and improved reliability.

Another aspect of the exemplary system in FIG. 1 is that it enables the application service provider 98 through the use of the service management center 201 to control hardware elements (endpoint devices 11) of various types located on the user premises 70 side of the network service provider demarcation 312 by communicating through the gateway device 10. The robustness of the gateway device 10, coupled with the central management capabilities of the service management center 201 and application service provider 98, allow the system to register, configure, provision, and enable intercommunication among, a wide variety of endpoint devices 11, such as TV, cell phone, radios, PC, and digital picture frames. Furthermore, the exemplary system can gather operational information such as billing records, alarms, statistical data, and log information associated with gateway device 10 and the endpoint devices 11 connected to gateway device 10. Such a centralized management greatly reduces the burden on end users in managing their equipment or network and provides an application service provider 98 through the service management center 201 the ability to optimize service delivery.

As previously mentioned, FIG. 1 demonstrates the exemplary network configuration. Broadly speaking the major components of the exemplary system are gateway device 10 which is connected to services management center 201 and thereby application service provider 98 via a wide area network, such as, by way of example, IP network 99. Furthermore, the exemplary system has gateway device 10 located on the user premises 70 associated with various endpoint devices 11.

As discussed in more detail below, the novel system architecture of the exemplary network configuration as shown in FIG. 1 allows for the management of services for the gateway device 10 and endpoint devices 11 and facilitates the easy addition of new services or modification of existing services on the gateway 10 and endpoint devices 11 via application service provider 98 through service management center 201. Such services may include, for example, facility management (home automation), media content downloading and Digital Rights Management (DRM), device updates, data backups, file sharing, media downloading, and transmission. All these services may be provided, from the user's perspective, without the intermediary of a plurality of external service providers who may typically provide these individual services for every endpoint device 11 in the user premises 70; rather, the user may receive, through the system architecture, application services for all these devices, which application services may be managed through the system architecture by a network service provider.

The software/firmware for these services resides in the gateway device 10. The gateway device 10 is integrated with hardware and software modules and respective interfaces that handle all aspects of home automation and digital endpoint service and management for the home in a manner without having to rely on external service providers and in a manner that is essentially seamless to the user. This is advantageously provided by the service management center 201 which is able to access regions of the gateway device 10 that are not accessible to the user for controlling the transport and storage of digital content and enabling service applications and upgrades that provide largely invisible support for many tasks performed by users through their endpoint devices 11.

As seen in FIG. 1, the gateway device 10 connects the various endpoint devices 11 together for enabling the user to experience a connected digital home, where information from one endpoint device 11 (for example voicemail from SIP Phone 40) can be viewed and acted on at another endpoint device 11 (for example the TV 32). The gateway device 10 thus hosts the various in-home endpoint devices 11 and facilitates the moving of information from one endpoint device 11 to another endpoint device 11. Some of the in-home endpoint devices 11 processing duties performed by the gateway device 10 include, but are not limited to,
1) detecting new devices and provide IP addresses dynamically or statically; 2) functioning as a (Network Address Translator) NAT, router and firewall; 3) providing a centralized disk storage in the home; 4) obtaining configuration files from the service management center and configuring all in-home devices; 5) acting as a registrar for SIP-based devices; 6) receiving calls from and delivering calls to voice devices, providing voicemail services; 7) decrypting and securely streaming media having digital rights management encoding; 8) distributing media to an appropriate endpoint device; 9) compressing and encrypting files for network back-up; 10) backing-up files to the service management center, to other elements within the system, or other off-site storage centers provided by third parties directly from the gateway device; 11) handling home automation schedules and changes in status; 12) providing in-home personal web-based portals for each user; 13) providing parental control services (e.g. URL filtering, etc.); 14) creating and transmitting billing records of endpoint devices 11 including, recording and uploading multi-service billing event records; 15) distributing a PC client to PCs $30a, \ldots, 30c$ in the home, used in support of the various services such as monitoring events or diagnostic agents; 16) storing and presenting games that users and buddies can play; 17) delivering context-sensitive advertising to the various endpoint devices 11; 18) delivering notifications to the endpoint devices 11; and 19) enabling remote access through the web and Instant Messaging (IM) as an example. Other duties the gateway device 10 may perform include: service maintenance features such as setting and reporting of alarms and statistics for aggregation, perform accessibility testing; notify a registration server (and location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

As will be described in greater detail herein below, the service management center 201 generally provides a communications and processing infrastructure for supporting the variety of application services and related communications residing at the gateway devices 10, $10_1 \ldots 10_n$. In an exemplary embodiment, this infrastructure may be configured to provide a secure environment and may be IP-based. Preferably, this support architecture is designed for high availability, redundancy, and cost-effective scaling.

The application service provider 98 in conjunction with the service management center 201, depicted in FIG. 1, manages application services for a number of gateway devices 10, $10_1 \ldots 10_n$ located at various users' premises 70. Connectivity for the various gateway devices 10, $10_1 \ldots 10_n$ to the service management center 201 and thereby the application service provider 98 is provided, in one embodiment, via a WAN termination interface, such as Ethernet WAN 53 over a broadband connection via the IP network 99, or, for example, via a wireless EvDO (Evolution Data Optimized) Internet data interface embodied as a PCMCIA (personal computer memory) wireless card 56, or a WiMax interface.

The gateway device 10 includes both a hardware and software infrastructure that enables a bridging of the WAN and LAN networks, e.g. a proxy function, such that control of any endpoint device 11 at any user premises 70 via the gateway device 10 using, optionally, a secure peer and presence type messaging infrastructure or other communications protocols, e.g. HTTPS. For example, as seen in FIG. 1, via any IM capable device or client 80a, 80b respectively connected with an IM or XMPP (Extensible Messaging and Presence Protocol) network messaging infrastructure, e.g. IM networks 99a, 99b such as provided by YAHOO, MICROSOFT (MSN), SKYPE, AMERICA ONLINE, ICQ, and the like, a user may access any type of functionality at a subordinate digital endpoint device 11 at and user premises 70 via the gateway devices 10, $10_1 \ldots 10_n$, and service management center 201 by simple use of peer and presence messaging protocols. In one exemplary embodiment, a peer and presence communications protocol may be used such as Jabber and/or XMPP. Particularly, Jabber is a set of streaming XML (Extensible Markup Language) protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint devices 11 or the respective applications of the endpoint devices 11 at the premises via the IM networks 99a and 99b.

In addition, the gateway device 10 and network connectivity to the novel service management center 201, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at user premises $70_1$ and a second gateway device $10_n$ located at user premises $70_n$. Thus, such an infrastructure provides for content addressing, enabling peers through remote gateway devices $10_1 \ldots 10_n$ to supply and request content such as files, media content or other resources of interest to a community of interest.

Figure 2:
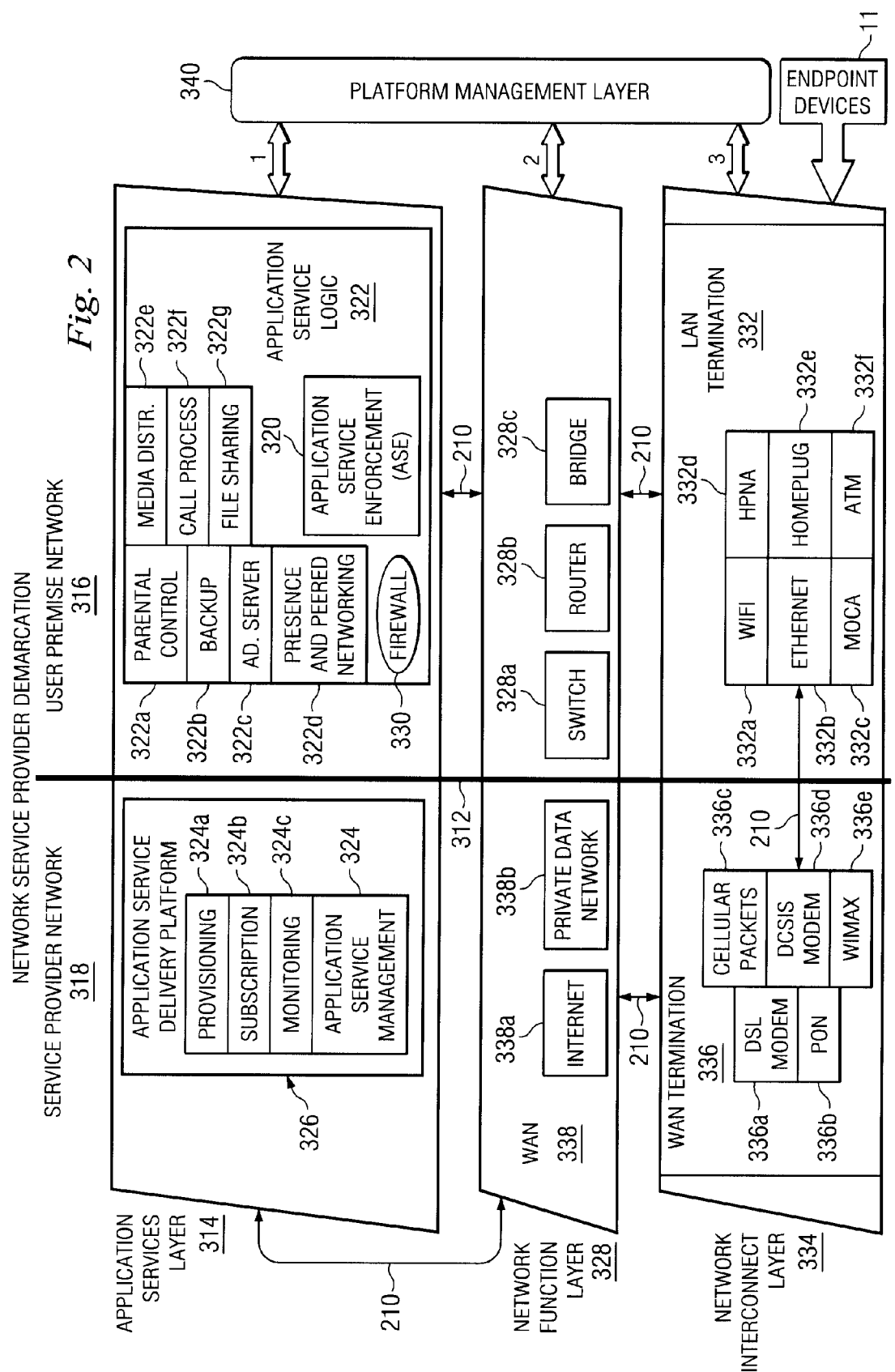
FIG. 2 is a high-level block diagram of an embodiment of the architecture of the exemplary system showing the demarcation between a gateway device and the service management center in reference to a network service provider demarcation.

To further demonstrate the novel architecture between the gateway device 10 and service management center 201 reference to FIG. 2 is now made. FIG. 2 is a high-level block diagram of an embodiment of the architecture of the exemplary system showing the demarcation between a gateway device 10 and the service management center 201 in reference to a network service provider demarcation 312. The logical network service provider demarcation 312 is formed at the edge of the wide area network at the user premises, between the wide area network and the equipment in the user premises. In a typical scenario, a network service provider takes responsibility for managing resources on the network side of the network service provider demarcation 312, leaving the user to manage everything on the user premises side. However, the gateway device 10 is implemented in such a manner as to offer its user many of the applications services, that were previously offered from network-side servers, from the user premises.

FIG. 2 shows that, in the exemplary architecture, many of these application service functionalities that were previously offered from the service provider network 318 exist across the network service provider demarcation 312 and logically reside at the application services layer 314 in the user premises network 316 on the hardware components located in the gateway device 10. In particular, the software/firmware that implements application services is logically positioned on the user premises network 316 of the network service provider demarcation 312.

The application services layer 314 shown in FIG. 2 represents the functional layers that provides access to applications services by application clients. These application services exist on a managed application service delivery platform (ASD) 326. The ASD 326 may include three functional modules, namely the application service enforcement (ASE) module 320, the application service logic (ASL) module 322, and the application service management (ASM) module 324.

On the user premises network 316 with respect to the ASD 326, the application services layer 314 includes the ASL module 322 which executes the application services that the gateway device 10 or endpoint devices 11 request. Such services may include parental control 322a, backup 322b, advertising server 322c, presence and peered networking 322d, media distribution 322e, call processing 322f, and file sharing 322g. Also, on the user premises network 316 with respect to the ASD is the ASE module 320. The ASE module 320 is responsible for enforcing the relevant application privileges to the application services. The ASE module 320 and the ASL module 322 must interact with each other so that the ASL module 322 can provide access to the client applications that have passed the policy enforcement procedures set forth in the ASE module 320. Additionally, a firewall 330 to protect the application client from application level attacks from the open Internet is located on the user premises network 316 within the application service layer 314.

Other elements shown in FIG. 2 that may reside in the gateway device 10 and logically positioned on the user premises network 316 include a network function layer 328 comprised of, but not limited to, a switch 328a, router 328b and/or a bridge 328c. The switch, router and bridge may optionally reside outside of the gateway device 10 and the functions thereof be performed elsewhere. Additionally, a LAN termination interfaces 332 located within the network interconnect layer 334 on the user premises network 316 may optionally include, but not be limited to the following interfaces: WiFi 332a, Ethernet 332b, Multimedia Over Coax Alliance (MOCA) 332c, Home Phoneline Networking Alliance (HPNA) 332d, HomePlug 332e, and Asynchronous Transfer Mode (ATM) 332f. Other interfaces currently known or to be developed may be included. The various LAN termination interfaces 332 allows bi-directional network layer communications on the user's side of the premises with one or more of the associated endpoint devices 11.

FIG. 2 also shows the WAN termination interfaces 336 at the network interconnect layer 334 on gateway device 10, but on the service provider network 318 side of the network service provider demarcation 312. The WAN termination 336 may include, but not limited to the following interfaces Digital Subscriber Line (DSL) modem 336a, Passive Optical Network (PON) 336b, cellular packets 336c, Data Over Cable Service Interface Specification (DCSIS) modem 336d, and Worldwide Interoperability for Microwave Access (WiMAX) 336e. Other interfaces now known or to be developed may be included. The WAN termination 336 provides connectivity to the wide area network (WAN) 338 at the network function layer 328 on the service provider network 318. The WAN 338 may include, but not limited to, the Internet 338a and a private data network 338b, for example. The WAN termination 336 enables bi-directional network layer communications for the associated endpoint devices 11 via a WAN and enables bi-directional communications between the gateway device 10 and the service management center 201 via the WAN.

With further reference to FIG. 2, the core of the logical capacities of the service management center 201 resides on the Service provider network 318, and is depicted as the Application Service Management (ASM) 324 portion of the application service delivery platform 326 in the application services layer 314. The ASM module 324 is implemented in the service management center 201, which is external to the user premises, and on the service provider network 318 side of the network service provider demarcation 312. The ASM module 324 may include functions such as provisioning 324a, subscription 324b, and monitoring 324c, for example.

Examples of various ASM module 324 functionalities performed at the service management center 201, from the service provider network 318 regime, include but are not limited to, initializing service in the gateway devices, providing security for the gateway devices and the network support infrastructure, enabling real time secure access and control to and from the gateway devices, distributing updates and new service options to the gateway devices, providing service access to and from the gateway devices and remote access to the gateway devices, for example. In support of these services, the service management center 201 provides the following exemplary additional services and features: authentication, multi-service registration, subscription control, service authorization, alarm management, remote diagnostic support, billing collection and management, web services access, remote access to gateway devices (e.g. via SIP or Internet/web based communications), reachability to access challenged gateway devices, software updates, service data distribution, location service for all services, SIP VoIP service, media services, backup services, sharing services, provisioning, gateway interfaces to other service providers (northbound and peering), load balancing, privacy, security, and network protection.

The logical network architecture for the service management center network 201 delivering these capabilities is illustrated and described in greater detail in the above-identified related applications.

The ASM module 324 is operable to provide the necessary data to the ASE 320 and ASL modules 322 for them to carry out their respective functions. Specifically, the ASE module 320 receives the policies and permissions of each application client from the ASM module 324 (such as provisioning data and subscription data) and enforces those policies against the requested actions by the client application. Furthermore, the ASL module 322 may interact with the ASM module 324 for monitoring purposes and status information such as call data recording and billing. The ASM module 324 also manages the overall security and integrity of the ASD 326.

Furthermore, the ASL module 322 and ASE module 320 maintain logical connectivity or interaction with the ASM module 324 in the service management center 201, typically via communication through WAN 338. This logical connectivity is established through an always-on (or on an as needed, periodic basis), secure control channel 210 between the application services layer 314 (ASL and ASE) of the user premises network 316 and the application services layer 314 (ASM) of the service provider network 318. The control channel 210 is established through the network function layer 328 and the network interconnect layer 334. Through the control channel 210, the service management center 201 communicates with one or more of the gateway devices 10 thereby providing an infrastructure to support and/or manage the application services offered to endpoint devices 11 and their users by logic implemented in the gateway device(s). This logic is called the gateway operational management software and will be further described below. Effectively, the ASD 326, considered in its entirety, extends all the way from the service provider network 318 to the user premises network 316 by traversing the network service provider demarcation 312.

FIG. 2 also introduces a logical platform manager layer 340 to the user premises network 316, which allows for interlayer allocation of local resources. The platform manager layer 340 guarantees access between the ASL module 322 on the user premises network 316 and the ASM module 324 in the service management center 201 by assuring that the local user premises hardware and software modules are functioning at a required state (CPU and memory usage, bandwidth usage, QoS settings, etc.) in order for the ASL module 322 to have the necessary resources to establish its required communications path to the ASM module 324. Note that the ASE, ASL and ASM modules are only examples of functions that may be logically bundled; other bundles, and other means of bundling these functions, are possible.

The platform manager layer 340, seen in FIG. 2, is also responsible for implementing that part of the managed application services to be performed by the gateway device 10. In that regard, the platform manager layer 340 secures and manages the overall hardware platform, given that in this scenario, the network function layer 328 and the application services layer 314 reside on one hardware platform. This secure hardware platform provides a robust and secure operating environment for the application services layer 314. Thus, to establish a secure and robust hardware operating environment, the platform manager layer 340 must interface (represented by arrows 1, 2, and 3) with all the layers above it and allow for bi-directional operational information flow among all of the functions including application services.

Application services represent functionalities, implemented in the upper layer(s) of the protocol or logical stack above the network layer(s) that may extend up to the application layer (layer 7 of the OSI model). An application service, for example, provides application server communication with a client functionality of one or more endpoint devices, for the respective service, communicated on top of network layer communications through the interfaces. In the exemplary system, the services are provided on a subscription service basis to users at the premises. The ASE module 320 provides enforcement regarding authorization, authentication, configuration, and/or use of the respective application service via the endpoint devices 11. The application service includes service and feature functions, implemented and controlled by the ASL module 322. Management of the application service is based on communications with the ASM 324 housed within service management center 201 via the WAN 338.

Examples of application services include, but are not limited to one or more of: media delivery, content management, access control and use tracking, file sharing, and protection and back-up services of both Internet/Web-generated digital media content and user generated digital media content. The disclosed gateway 10 device thus is configured and programmed to simplify various aspects of managing the emerging home/business digital networks including the myriad of interconnected digital endpoint devices 11 associated with the gateway device 10. The endpoint devices 11 need not reside within, or be located at, the premises to maintain their association with the gateway device 10. Application service functionality of the gateway device 10, as provided by the exemplary system, is enabled/disabled and configured by an application service provider 98 (FIG. 1), via communications between the gateway device 10 and the service management center 201.

As shown by the discussion of FIG. 2, application service software/firmware is logically positioned on the user premises network 316, that is to say on the user premises side of the network service provider demarcation 312. The gateway device 10 software/firmware however, also defines a logical service provider-user demarcation between the user premises and the application service provider, as will be described in more detail with regard to FIG. 3.

Thus referring to FIGS. 1 and 2, the gateway device 10 and service management center 201 move substantial functions performed by the typical network server into the user premises by incorporating those functions in a way that allows for the server functionality to be externally managed by the service management center 201 which may be operated by a third-party service provider such as an application service provider 98. In this exemplary system, both the server functionality and the application services offered via the gateway device 10 may be managed by the service management center 201. Moreover, the server function residing in the gateway device 10 is not only located on the user premises but it now resides logically on the user premises side of the network service provider demarcation 312 and on the service provider side of the applications service provider demarcation 392 (see further discussion below in reference to FIG. 3).

Figure 3:
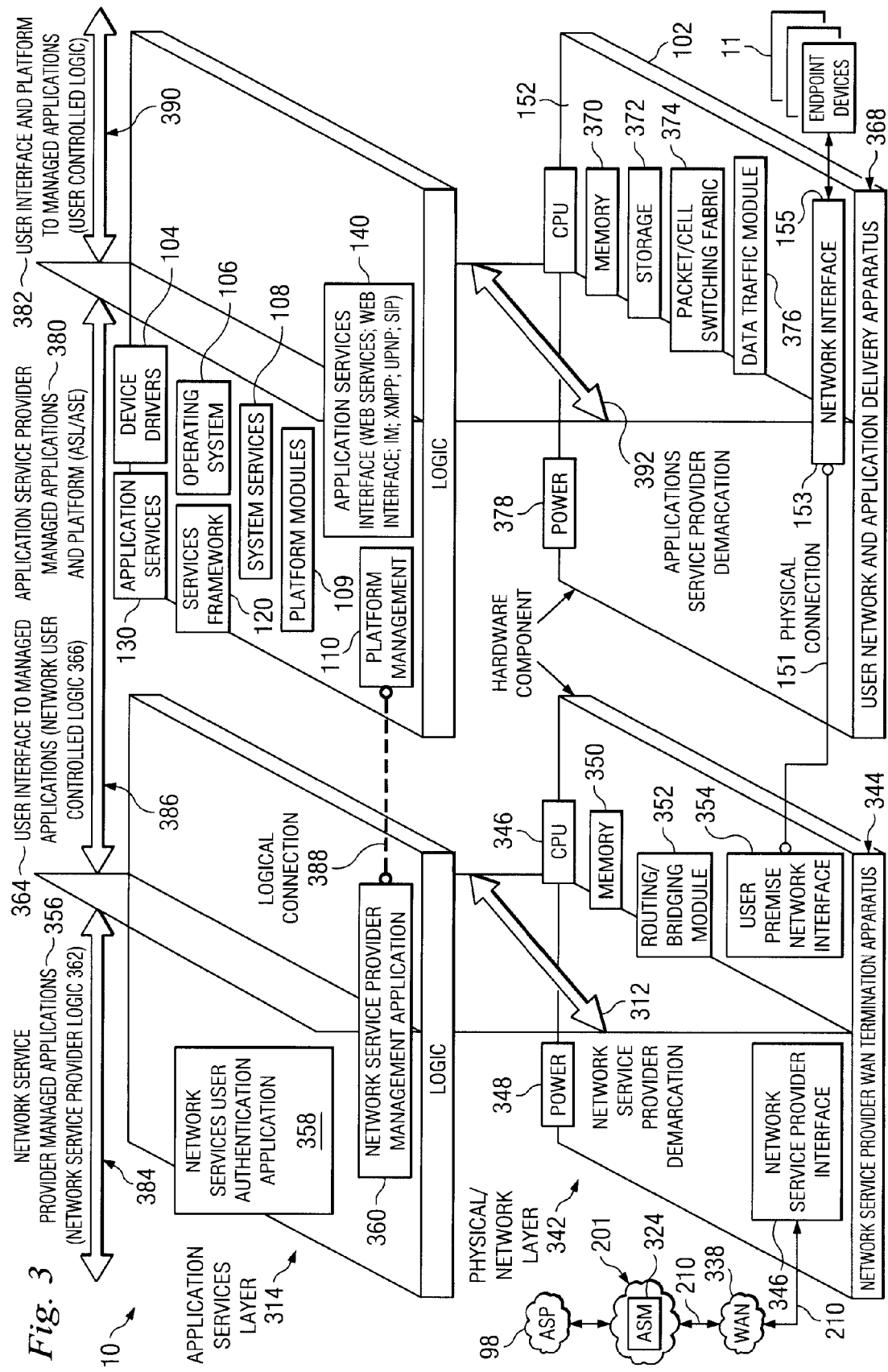
FIG. 3 is a high-level block diagram of an embodiment of the software and hardware components of a gateway device together with a network service provider termination apparatus, and shows a network service provider demarcation as well as an application service provider demarcation.

FIG. 3 is a high-level block diagram of an embodiment of the software and hardware components of a gateway device together with a network service provider termination apparatus 344, and shows a network service provider demarcation 312 as well as an application service provider demarcation 392. At the physical/network layer 342, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) 344 allows for a typical termination of WAN 338 at a network service provider interface 346 for such services as DSL, cable, and fiber. Additional components within the NSP-TA 344 may include a CPU 346, power 348, memory 350, routing/bridging module 352, and a user premises network interface 354, for example. The NSP-TA 344 may be an existing user-premises device, provided by the carrier supplying network services to the premises. FIG. 3 also depicts the network service provider demarcation 312 at the hardware level.

In order for network service providers to deliver managed services, they typically require a management element controlled by the CPU 346 on the NSP-TA 344. To depict these logical elements residing on the hardware components, FIG. 3 includes a representation of the application services layer 314 above the physical/network layer 342. This layer corresponds to the application services layer 314 of FIG. 2, but without reference to any logical elements residing at the network services provider. The management element, represented by the network service provider managed application 356, allows the network service provider to determine the status of the network hardware device and interfaces as well as maintain a certain degree of security enforcement at the customer premises.

As noted, the network service functionality is at the network interconnect layer 334 and network function layer 328 (displayed in FIG. 2) and generally does not extend to the application services layer 314 beyond basic authentication, authorization and state management as depicted by network services user authentication application module 358. As with the hardware components, the logical elements also have a network service provider demarcation 312. On the WAN side, depicted as the network service provider managed applications 356 side, of the network service provider demarcation 312, resides within the network service provider management application module 360 the applications that are managed by the network service provider logic 362. The network service provider logic 362 allows the network service provider the exclusive control over the applications within the portion of the network service provider management application module 360 that are logically on the network service provider managed applications 356 side.

The user interface to managed applications 364 is present on the LAN side of the network service provider demarcation 312 within the application services layer 314. Within this interface resides software/firmware and logic available to users other than the network service provider referred to as the network user controlled logic 366. The network user controlled logic 366 provides a user interface to the network service provider logic 362 and, to the extent permitted by the network service provider logic 362, interaction with or communication between the user and network service provider through the network user controlled logic 366 and the network service provider logic 362, and to the NSP-TA 344 hardware components. The network user controlled logic 366 allows the user of the NSP-TA 344 to make certain minimal software/firmware changes relevant to their preferences (e.g. user name and password changes, local IP addresses changes, local interface selection). All user devices typically can only communicate with the NSP-TA 344 through one or more of the user premises network interfaces 354. The user can modify the network user controlled logic 366 through the user premises network Interface 354. The network service provider demarcation 312 is typically within the NSP-TA 344, logically dividing the network service provider interface 346 and the user premises network interface modules 354. The network service provider does not have any in-depth visibility or significant responsibility beyond the network service provider demarcation 312.

Additionally, shown on the right hand side of FIG. 3 is the User Network and Application Delivery Apparatus (UNA-DA) 368, which is depicted as a separate managed gateway device 10 (but as described below may optionally be combined with elements of the NSF-TA 344) that a managed-service provider (which may be different than the network service provider) would control in delivering a set of application services to the user premises 70 (FIG. 1). FIG. 3 illustrates the logical architecture of the software and hardware of the gateway device 10 together with a NSP-TA 344 for broadband connection to WAN 338. The gateway device 10 is an application delivery apparatus, for delivering application services to endpoint devices 11 using network layer communications through the network interface 153. FIG. 3 also illustrates two relevant demarcations and a termination which delineate control/management access with respect to the functionalities of the gateway device 10. To be described further below, FIG. 3 shows the arrangement of the ASL module 322 and the ASE module 320 of FIG. 2 as being logically positioned between these two demarcations which results in significant management control by the application service provider 98 and relieve the user of significant burdens in arranging and configuring the systems/services at the user premises 70 (FIG. 1).

With respect to the two demarcations 312 and 392 shown in FIG. 3, one of the demarcations as outlined above is the network service provider demarcation 312. To identify the separation of, and distinguish between, the software/firmware and hardware components subject to control by the application service provider 98 and those subject to control by the user at the user premises, FIG. 3 identifies a dividing line across the logical elements of the UNA-DA 368, and a corresponding dividing line across hardware components, referred to as the applications service provider demarcation 392. The arrows at the top of FIG. 3 thus show the delineations in management responsibility created by the two logical demarcations 312 and 392. The covered area to the left of the network service provider demarcation 312 as depicted by arrow 384 is the network service provider's responsibility. By contrast, the area covered by arrow 390 which represents anything to the right of the application service provider demarcation 392 is the end user's responsibility. However, the logic and hardware between these two demarcations, as depicted by arrow 386, is the application service provider's 98 responsibility. This arrangement of two demarcations and the attendant logical demarcations in management access to the hardware resources at the premises result in significant management control by the application service provider 98 and relieve the user of significant burdens in arranging and configuring the systems/services at the premises.

It should be noted that the logical connection 388 between the network service provider management application 360 and the platform management 110 may be provided to the NSP-TA 344 to enable the application service provider 98 to assume any user's responsibility in managing the network user control logic 366 of the NSP-TA 344. Therefore, the end user would no longer be responsible for managing any element with respect to the NSP-TA 344.

Referring to FIG. 3, the managed gateway device 10 is composed of several elements at both the physical/network layer 342 and the application services layer 314. At the physical/network layer 342, the device 10 includes its own dedicated CPU 152, memory 370, packet/cell switching fabric 374, data traffic module 376 and power 378 as well as its own dedicated set of interfaces. The UNA-DA 368 includes one or more network interfaces 153 providing connectivity to the NSP-TA 344 as well as to user premises endpoint devices 11. One skilled in the art will readily recognize, however, that the physical connection 151 that connects the UNA-DA 368 to the NSP-TA 344 also provides connectivity for the UNA-DA 368 to the WAN 338, and is the means by which the UNA-DA 368 accesses the WAN 338.

Programming elements of the UNA-DA 368 in the gateway device 10 are depicted at the application services layer 314 of the UNA-DA 368. The software/firmware corresponding to the ASL module 322 and the ASE module 320 of FIG. 2 reside on the application service provider managed applications and platform 380 (FIG. 3). The application service provider managed applications and platform 380 is managed by the managed application service provider 98 in conjunction with the service management center 201 housing the ASM module 324. The application service provider 98 accesses the application service provider managed applications and platform 380 by means of control channel 210 through the WAN 338.

Other logical elements that form the application service provider managed applications and platform 380 include, but are not limited to, device drivers 104, operating system 106, system service 108, and platform module 109. These logical elements are described with respect to FIGS. 4A and 4B below. Another logical element that forms the application service provider managed applications and platform 380 includes the application service interface 140. The application service interface 140 enables communications from user endpoint devices 11 with the application service provider managed applications and platform 380.

The application service provider managed applications and platform 380 includes a platform management module 110 that, with other software/firmware in the platform and the ASM 324, allows the managed application service provider 98 to control the hardware elements of the UNA-DA 368 in addition to other relevant application services logic or hardware that may reside on the user premises. For example, this software/firmware enables a managed application service provider 98 to control and manage the hardware elements on the UNA-DA 368 to ensure proper use and allocation of the UNA-DA's processing, memory, storage, and bandwidth, to monitor local hardware security and generate needed alarms or protection sequences, and to prioritize applications based on a set of established policies. The user would have control over specific parameters of application services obtained through the UNA-DA 368, through the user interface and platform to managed applications 382 shown in FIG. 3. These parameters allow the user to control the local behavior of the interfaces and to configure the specific applications to implement the user preferences for those applications.

The application service provider 98 can interact with the network service provider's managed applications through the network service provider management application 360. This is an optional function but it helps show how the gateway device 10 can interface with a network device, such as the NSP-TA 344, from a network service provider, and provide a unified application interface. The logical connection 388 represent this management relationship between platform management logic module 110 in the gateway device 10 and the network service provider management application 360 in the NSP-TA 344. In effect, the application service provider 98 manages the NSP-TA 344 for the user, even though it is not the application service provider's hardware. In the case where the application service provider is a network service provider as well, then it would work in practically the same way. If the NSP-TA is the application service provider's own hardware, the degree of integration and control can be elevated even more.

FIG. 3 also shows how the software/firmware elements on the gateway device 10 effectively partitions the hardware at the application service provider demarcation 392, which gives the application service provider 98 the ability to provide a managed Peer-to-Peer private service that will enable that provider to use the gateway device 10 for performing distributed computing, search, indexing, file backup, sharing, etc., all managed and controlled by the application service provider 98 through service management center 201.

In another embodiment, the two hardware regimes described above (NSP-TA 344 and the UNA-DA 368) may be combined into one managed hardware platform. This would in effect replace the "user" access with a managed "machine" access, for aspects of the NSP-TA 344, as well as aspects of the application services offered through the UNA-DA 368. Thus, the combination creates an integral gateway device 10 providing both network service and application services, under centralized management. Although integrated, network interconnect functions of the NSP-TA 344 may still be managed by the network service provider, as in the example of FIG. 3. Those skilled in the art will readily see additional suitable combinations and configurations for the hardware comprising the NSP-TA 344 and the UNA-DA 368. For example, in a further embodiment, all the hardware dedicated to the network service provider interface 346 may reside and be integral with the hardware comprising the UNA-DA 368. Thus, the network service provider interface 346 may reside on the UNA-DA 368.

Figure 4A:
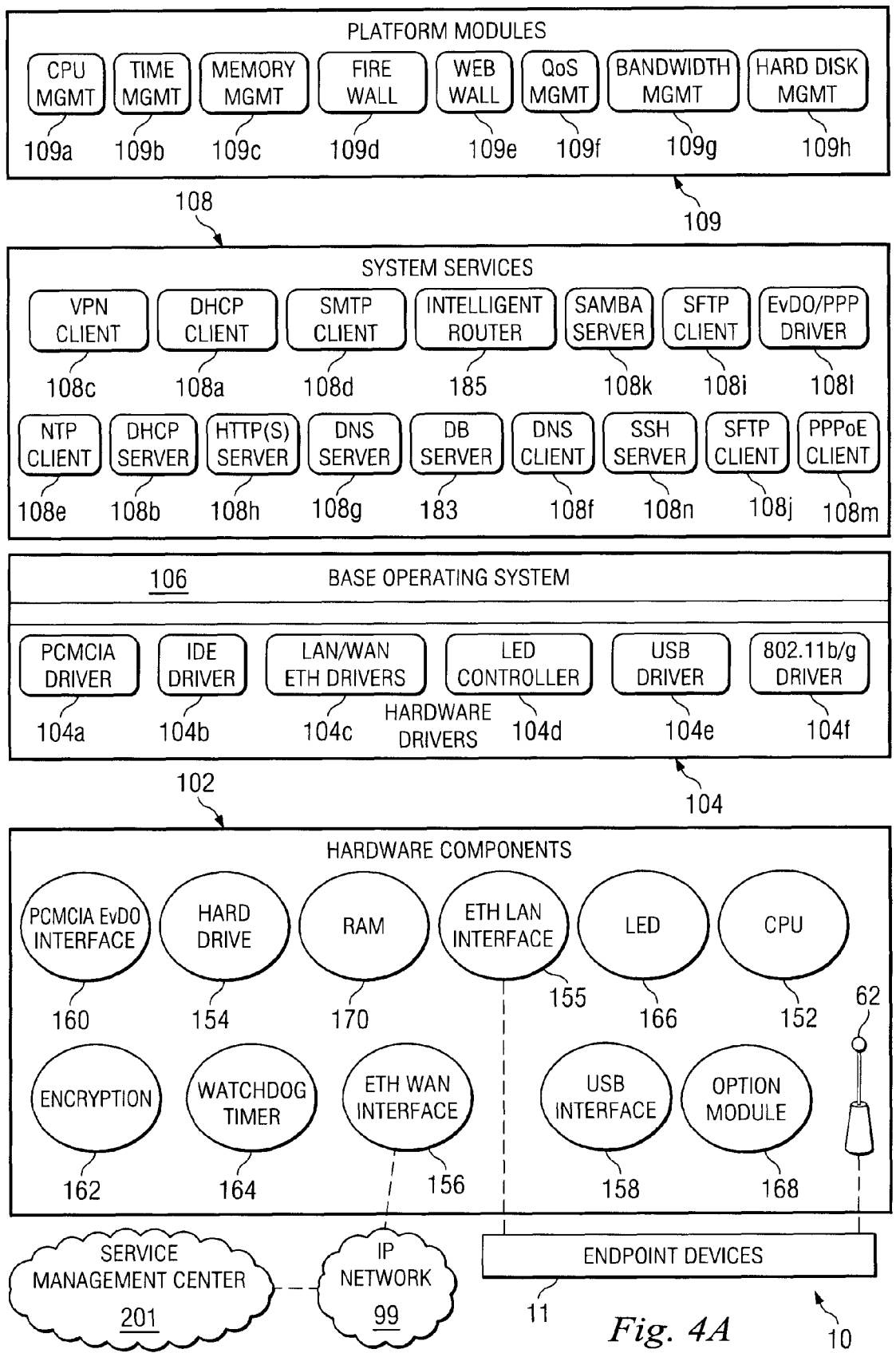
FIGS. 4A and 4B are more detailed logical diagrams of an embodiment of an exemplary gateway device.
Figure 4B:
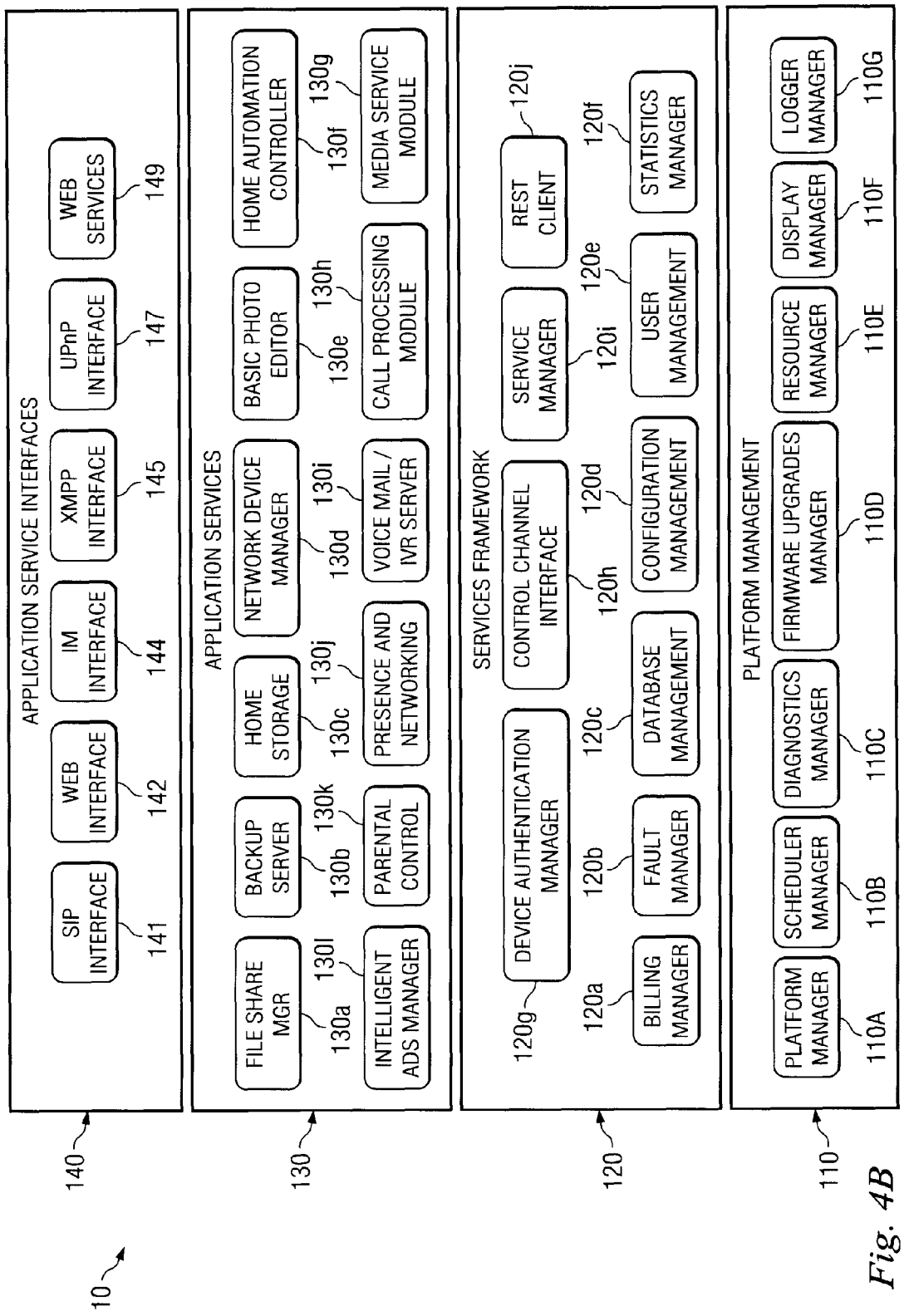

The composition of the premises gateway device 10, earlier described with reference to FIG. 3, is now described in greater detail with reference to FIGS. 4A and 4B. FIGS. 4A and 4B are more detailed logical diagrams of an embodiment of an exemplary gateway device 10. As shown in FIGS. 4A and 4B, the gateway device 10 utilizes a layered architecture, which enables the encapsulation of similar functionality and the minimization of dependencies between functions in different layers. FIG. 4A shows the lower portion of the layered architecture, and FIG. 4B shows the upper portion of the layered architecture. The completed set of layers can be conceptualized as if FIG. 4B was combined with FIG. 4A, with the layers of FIG. 4B above those of FIG. 4A. FIGS. 4A and 4B also depict exemplary functionality (hardware and logical) resident in each of the layers.

The layered architecture includes, but not limited to, a hardware components layer 102, hardware driver layer 104, base operating system layer 106, system services layer 108, platform modules layer 109, platform management layer 110, services framework layer 120, application services layer 130, and application services interfaces layer 140. These layers combined represent the layered architecture of the exemplary gateway device 10.

An overview of FIGS. 4A and 4B made in reference to FIGS. 2 and 3 is provided for orientation purposes. The logical elements of the network interconnect Layer 334 residing on the gateway device 10 (FIG. 2) are found in the hardware drivers layer 104 in FIG. 4A, which govern the operation of the hardware components layer 102. The processor runs a base operating system shown in FIG. 4A at layer 106, which plays a role in each of the network interconnect 334, network function 328, application services 314 and platform manager layer 340 (FIG. 2). Logical elements represented by the network function layer 328 (FIG. 2) comprise elements from the system services layer 108 (FIG. 4A). In a similar fashion, the platform manager layer 340 (FIG. 1) is implemented in the exemplary architecture of FIGS. 4A and 4B by the platform modules 109 and the platform management layer 110. Particular logical elements comprising the ASL module 322 and ASE module 320 of the application services layer 314 (FIG. 2) are shown in FIG. 4B as comprising logical elements from each of services framework 120 and application services 130. The layered architecture displayed in FIG. 4B facilitates reuse or sharing of logic across the layers to provide a managed services framework 120. Finally, application services interface 140 enables communications from user endpoint devices 11 (FIG. 1) within their respective service environments.

As shown in FIG. 4A, the hardware components layer 102 includes a central processing unit (CPU) 152, which may be a system on a chip that includes processing elements, digital signal processor resources and memory. The implementation of functions and the related control such as a router (with quality of service (QoS)), firewall, VoIP gateway, voice services and voice mail may be embodied and performed within the CPU 152.

The CPU 152 is also coupled to a random access memory (RAM) 170 and additionally, non-volatile hard drive/disk magnetic and/or optical disk memory storage 154. Generally, the hard drive/disk magnetic and/or optical disk memory storage 154 provides non-volatile storage of computer readable instructions, data structures, program modules, objects, service configuration data and other data for use by the gateway device 10. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device and/or other devices.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. For wireless connections, the cards would be associated with WiFi LAN access point 62 to enable a wireless connection. The Ethernet LAN interface 155 provides data communication connectivity within the user premises, essentially, for communication with any endpoint devices operating within the premises. The Ethernet WAN interface 156 provides data communication connectivity for the gateway device 10 and endpoint devices 11 (not shown) communicating through the device 10, with the wide area network like IP network 99 shown in FIG. 1.

For additional or alternative customer premises communications, the hardware components 102 may also include one or more USB interfaces 158. Furthermore, for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

The hardware layer 102 may also include an option module 168. The hardware components at layer 102 have multiple interfaces for connection to such an option module 168. These interfaces, by way of example, could be a data bus (e.g. PCI, etc), network interface (e.g. Ethernet (RJ45), MoCA/HPNA (Coax)) and Power feeds. The option module 168 allows additional functionality to be added to the gateway device 10 at the hardware layer 102. For example, this additional functionality could be everything from support for a variety of extra WAN interfaces (e.g. xDSL, DOCSIS, Fiber (PON), cellular packet, WiMAX, etc.), media processing (e.g. Cable TV termination, Digital Video Recording, Satellite TV Termination, over-the-air broadcasting, etc), to voice processing (FXS, FXO, Speech Detection, Voice to Text, etc). The option module 168 may have its own standalone CPU, memory, inputs/outputs, storage, or provide additional functionality by its use of the CPU, memory, inputs/outputs, and storage facilities off of the other hardware layer 102 components. The option module 168 may be managed indirectly by the platform manager layer 340 (FIG. 2).

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

As further shown in FIG. 4A, the hardware drivers layer 104 comprises a multitude of driver interfaces including but not limited to: a PCMCIA driver 104a, for enabling low level communication between the gateway CPU 152 and the PCMCIA network interface card wireless interface, an IDE driver 104b for enabling low level communication between the gateway CPU 152 and the local mass memory storage element, and LAN/WAN Ethernet drivers 104c for enabling low level communication between the gateway CPU 152 and the respective network interface cards 155 and 156. The exemplary driver layer also includes, but not limited to an LED driver/controller 104d for driving LED(s) 166, a USB driver 104e allowing CPU 152 to communicate via USB interface 158, and an 802.11b/g (or n) wireless network driver 104f for allowing the CPU 152 to communicate via the WiFi LAN access point 62. The drivers provide the logical connectivity between the low level hardware devices 102 and the base operating system 106.

The base operating 106 controls the execution of computer programs and provides scheduling, input-output control, file and data management, memory management, and communication control and related services for the gateway device 10. With respect to the base operating system 106, the gateway device 10 architecture may support any embedded operating system, any real-time operating system, any open source operating system, any proprietary operating system, or even any operating systems for mobile computing devices as long as the operational needs of the client discussed herein below can be met. Exemplary operating systems that may be employed include WINDOWS, MACINTOSH, LINUX or UNIX or even an embedded Linux operating system. For instance, the gateway device 10 may be advantageously provided with an embedded base operating system 106 that provides operating system functions such as multiple threads, first-in first-out or round robin scheduling, semaphores, mutexes, condition variables, and message queues, for example.

Built upon the base operating system 106, as shown in FIG. 4A, is a system services support layer 108 providing both client-like and server-like functions that enable a wide range of functionality for the types of services capable of being managed by the gateway device 10. For instance, a Dynamic Host Configuration Protocol (DHCP) client 108a and server 108b software modules are provided. The DHCP client particularly requests via a UDP/IP (User Datagram Protocol/Internet Protocol (e.g., IPv4, IPv6, etc.) configured connection information such as the IP address that the gateway device 10 has been dynamically assigned by a DHCP service (not shown), and/or any the subnet mask information the gateway device should be using. The DHCP server dynamically assigns or allocates network IP addresses to subordinate endpoints 11 on a leased basis. A Virtual Private Network (VPN) client 108c may communicate via a proxy server in the service management center 201, according to a VPN protocol or some other tunneling or encapsulation protocol. An SMTP client 108d handles incoming/outgoing email over TCP, in accordance with the Simple Mail Transfer protocol. A Network Time Protocol (NTP) 108e (RFC 1305) generates and correlates timestamps for network events and generally provides time synchronization and distribution for the Internet. A Domain Name Server (DNS) client 108f and server 108g combination are used by the IP stack to resolve fully-qualified host or symbolic names, i.e. mapping host names to IP addresses.

An HTTP(S) server 108h handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client 108*i* and server 108*j* combination govern the ability for file transfer over TCP. A SAMBA 108*k* server is an open source program providing Common Internet Files Services (CIFS) including, but not limited to file and print services, authentication and authorization, name resolution, and service announcement (browsing). An EvDO/PPP driver 108*l* includes a Point-to-Point Protocol (PPP) daemon configuration for wireless broadband services. A PPPoE (Point-to-Point Protocol over Ethernet) client 108*m* combines the Point-to-Point Protocol (PPP), commonly used in dialup connections, with the Ethernet protocol. The PPPoE client 108*m* supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway 10 and can be used to enable all users of an office or home to share a common Digital Subscriber Line (DSL), cable modem, or wireless connection to the Internet. A Secure Shell or SSH 108*n* server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway device 10. A central database server 183 handles all of the database aspects of the system. For example, the database server 183 maintains and updates registries and status of connected digital endpoint devices 11 (FIG. 1), maintains and updates service configuration data, services specific data (e.g. indexes of backed-up files, other service specific indexes, metadata related to media services, etc.) and firmware configurations for endpoint devices 11 (FIG. 1). The database server 183 may also store billing and transaction detail records and performance diagnostics. The database server logic 183 also satisfies all other database storage needs as will be described in greater detail herein.

Built on top of the system services layer 108 is the platform module layer 109 as seen in FIG. 4A. The platform module layer 109 provides a software framework for base operating system layer 106 and communications level platform functionality such as CPU management 109*a*, timer management 109*b*, memory management functions 109*c*, a firewall 109*d*; a web wall 109*e* for providing seamless WWW access over visual displays via access technologies enumerated herein, (e.g., HTTP, SMS (Short Messaging Service) and WAP (Wireless Access Protocol)), QoS management features 109*f*, bandwidth management features 109*g*, and hard disk drive management features 109*h*.

The layered architecture further provides a platform management layer 110 as shown in FIG. 4B, which together with the platform modules 109 implement the platform manager layer 340 discussed earlier (FIG. 2). In the layered architecture, the platform management layer 110 and elements shown above it in FIG. 4B are built upon the platform modules 109.

The features and functions in platform management layer 110 include a platform manager module 110*a* which will implement unique rules based notification services. On operational failure, for example, when one of the components or services fails, the platform manager module 110*a* would detect this failure and take appropriate action such as implement a sequence of rules to provide notification to a user. Another module within platform management layer 110 is a scheduler manager module 110*b*. Scheduler manager module 110*b* manages scheduled device maintenance, managing scheduled services, e.g. back-up services, etc. The layer 110 also includes a diagnostics manager module 110*c* and a firmware upgrades manager module 110*d* for managing firmware upgrades. A resource manager module 110*e* manages system resources and digital contention amongst the various resources (e.g. CPU/bandwidth utilization) within platform management layer 110. A display manager module 110*f* and a logger manager module 110*g* store and track gateway log-in activity of users and applications, e.g. voice call logs, at the user premises.

The platform management layer 110 in concert with resource manager module 110*e* and the platform manager module 110*a* enforce the separation of network-side managed service control and user-side delegations depending upon service subscriptions and configurations. For example, the platform manager module 110*a* and resource manager module 110*e* encompass rules and guidelines provided according to subscribed services that act to enforce, manage, and control the input/output operations and use of hard drives space. Thus, the operation of the platform manager module 110*a* and resource manager module 110*e* help to determine the line between what is "owned by" the customer and what is "owned by" the application service provider thereby establishing the application service provider demarcation 392 as seen in FIG. 3.

In general, the logical platform management layer 110 allows for inter-layer allocation of local resources. This function guarantees access between the application services/management logic implemented at the higher layers of the architecture within the gateway device 10 and the applications service management function in the service management center 201, by assuring that the local user premises hardware and software modules are functioning at a required state (CPU and memory usage, bandwidth usage, QoS settings, etc.). The platform management layer 110 is also responsible for implementing that part of the managed application services to be performed by the gateway device 10. In that regard, the platform management layer 110 secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer 110 must interface with all the layers above it and allow for bi-directional operational information flow among all of the functions.

Referring back to FIG. 4B, built on top of the platform management layer 110 is the Services Framework Layer 120, which provides a library of application support service processes that facilitate data collection and data distribution to and from the endpoint devices (FIG. 1). The application support service processes include, but are not limited to, a device authentication manager 120*g* for use in authenticating devices connected to the gateway device and the user of the gateway device, a billing manager 120*a* for collecting and formatting service records and service usage by endpoint devices, (e.g., calls, back-up services etc.), a fault manager 120*b* for detecting and managing determined system and/or service faults that are monitored and used for performance monitoring and diagnostics, a database manager 120*c*, a control channel interface 120*h* via which the gateway initiates secure communications with the operations support infrastructure, a configuration manager 120*d* for tracking and maintaining device configuration, a user manager 120*e*, a service manager 120*i* for managing service configuration and firmware versions for subscribed services provided at the gateway device, and a statistics manager 120*f* for collecting and formatting features associated with the gateway device. Statistics may relate to the use of one or more services and associated time-stamped events that are tracked. Finally, the layered service architecture shown in FIG. 4B additionally provides the gateway device 10 with intra-process communication and inter-process communication amongst the many services and modules in the service framework layer 120 that enables the provisioning, management and execution of many applications and services at the application services layer 130.

As seen in FIG. 4B, next to the Services Framework layer 120 is the application services layer 130 providing library of user application services and application support threads including, but not limited to, file share manager 130*a*, backup server 130*b*, home storage 130*c*, network device manager 130*d*, basic photo editor 130*e*, home automation controller 130*f*, media services module 130*g*, call processing module 130*h*, voice mail and interactive voice response (IVR) server 130*i*, presence and networking 130*j*, parental control 130*k*, and intelligent ads manager 130*l*.

The gateway device 10, shown in FIG. 4B, further provides application service interfaces 140 that are used to enable a variety of user applications and communications modalities. Furthermore, the application service interfaces 140 enable communications from user endpoint devices 11 (FIG. 1) within service environments. In that regard, the application service interfaces 140 enable the application services 130 to act as an appropriate server with respect to client device application or service functionality of the endpoint devices 11 (FIG. 1). The application service interfaces 140 also enable corresponding interfaces for the application services with aspects of service environments implemented outside the user premises. In that regard, the interfaces 140 enable the application services layer 130 to act as an appropriate client, for extending the application or service related communications to a server accessed via a wide area network, such as a server of the service management center 201 (FIG. 1).

Specific application service interfaces 140 might include a Session Initiation Protocol (SIP) Interface 141. SIP interface 141 is an interface to the generic transactional model defined by the session initiation protocol that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a session border controller element in the service management center 201 (FIG. 1).

Additionally, application service interfaces layer 140 may include the web interface 142 that enables HTTP interactions (requests and responses) between two applications. Also, the Web services interface 149 that provides the access interface and manages authentication as gateway device 10 access the service management center 201 via web services may be included in the application service interface layer 140. The IM Interface 144, which can optionally be located within the application service interface layer 140, is a client that enables the gateway device 10 to connect to one or more specific IM network(s). As further shown in FIG. 4B within the application service interface layer 140, the UPnP (Universal Plug and Play) interface 147 enables connectivity to other stand-alone devices and PCs from many different vendors.

The XMPP interface 145, within the application service interface layer 140, is provided to implement the protocol for streaming (XML) elements via the gateway device 10, in order to exchange messages and presence information in close to real time, e.g. between two gateway devices. The core features of XMPP interface 145 provide the building blocks for many types of near-real-time applications, which may be layered as application services on top of the base TCP/IP transport protocol layers by sending application-specific data qualified by particular XML namespaces. For example, the XMPP interface 145 provides the basic functionality expected of an IM and presence application that enable users to perform the following functions including, but not limited to, 1) exchange messages with other users, 2) exchange presence information with other devices, 3) manage subscriptions to and from other users, 4) manage items in a contact list (in XMPP this is called a "roster"), 5) block communications to or from specific other users by assigning and enforcing privileges to communicate and send or share content amongst users (buddies) and other devices, and 6) communicating with applications in the service management center and vice versa. The synchronization of allowed services and features and the real-time notification of service and configuration changes can be communicated through this interface.

Now that the components of gateway device 10 have been described in detail, attention will now turn to the activation, initialization, authentication and authorization of the gateway device 10 within the exemplary system. In gateway device 10, the service manager 120*i* shown in FIG. 4B drives activation, initialization, authentication and authorization. To perform these functions, also shown in FIG. 4B, the service manager 120*i* interacts with the representational state transfer (REST) client 120*j*, control channel interface 120*h*, and network device manager 130*a*. Additionally, the service manager 120*i* interacts with the system services layer 108 shown in FIG. 4A, including the DHCP client 108*a*, the DHCP server 108*b*, and the web server 108*c*. Further details will be described below with reference to how the components of gateway device 10 are used for activation, initialization, authentication and authorization purposes. The architecture may also utilize the hardware and software of endpoint devices, such as STB/DMA, that are associated with the gateway device in activation, initialization, authentication, and authorization processes.

Figure 5:
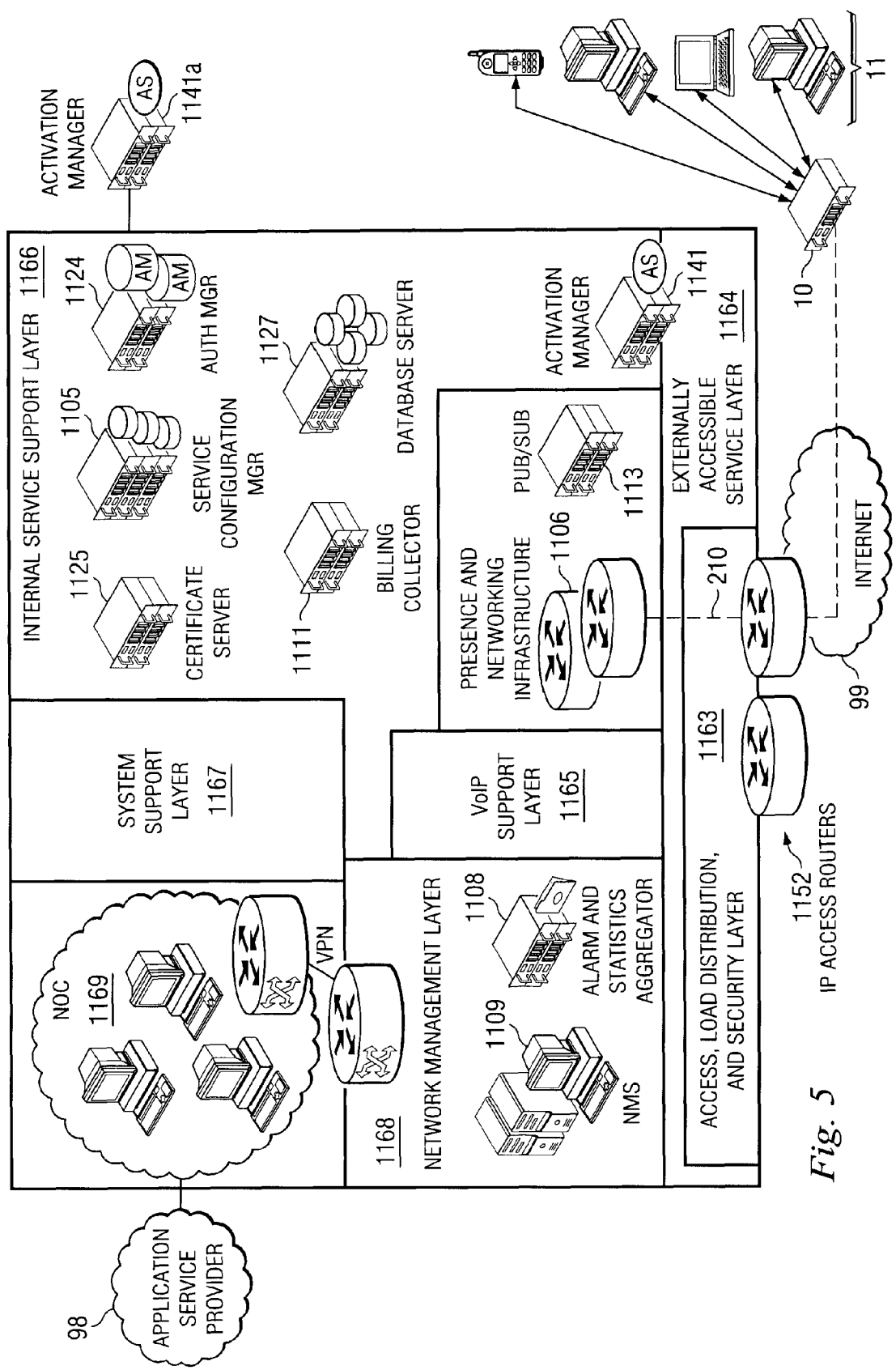
FIG. 5 is an architectural diagram of an embodiment of a service management center.

In addition, as shown in FIG. 5, the activation, initialization, authentication, and authorization of gateway device 10 involves databases, software, and services in the service management center 201. Specific to activation, initialization, authentication, and authorization, the service management center maintains the gateway device's activation state, system service state, and application services state, and stores configuration information, location information, service provider ID, and subscription information with respect to each gateway device 10 within the exemplary system. The gateway device's initial state, prior to activation, may be stored optionally at the activation manager 1141 or the database server 1127, or other storage device as may be within the choice of the skilled artisan. After activation, the information is preferably stored on the database server 1127. The state of a gateway device 10 provides information relevant to whether a gateway is activated within the exemplary system (i.e. able to provide managed application services). Configuration information refers to information concerning the current configuration of the gateway device 10 with respect to the various application services and hardware resources attached to gateway device 10. Location information refers to the location of the gateway device within the exemplary network such that the gateway device 10 can be accessed via the appropriate network layer addressing. The service provider ID dictates with which application service provider 98 the gateway device 10 has been associated to provide application services. Finally, the subscription information refers to the application services provided by application service provider 98 that the end user has subscribed to and thereby can be used by gateway device 10.

The database server 1127 is used by the various managers in the service management center 201 including the authentication manager 1124 and the service configuration manager 1105. In addition, these managers provide services to the activation manager 1141. Details concerning these managers will be described in greater detail below.

The process of activation of the gateway device is preferably separate from the process of system service connectivity to the service management center, and the resultant authentication and authorization of the gateway device. The activation manager 1141, as seen in FIG. 5, is a scalable server with a well known fully-qualified domain name that serves all gateway devices 10 during activation. Activation manager 1141 activates gateway devices 10 independent of any one application service provider 98 that a particular gateway device 10 may belong to or will belong to after activation. To be discussed in more detail below, the high level function performed by the activation manager 1141 is to assign a gateway to a service management center 201. Because any one network service provider may operate multiple service management centers, and because one or more network service providers may operate service management centers, the gateway device is in open communication with the assigned network service provider and the assigned service management center operated by that network service provider. Likewise, system security is provided so that that only intended devices are allowed access to the service management center. Once the gateway device opens network communications and seeks to activate with the activation service, the activation manager 1141 (or 1141*a*) authenticates the gateway device based on the activation certificate (to be described in more detail below) that is given to the gateway device at the time of manufacture, and also authorizes and assigns the gateway device to at least one service management center. That authorization and assignment may be based on the provisioned attributes and various policies and rules established in connection with the creation and operation of the system. The gateway's assignment to a service management center and application service provider is confirmed by the service provider ID residing in the database of the service management center. The service provider ID is then transferred to the gateway device. The deferral of the assignment of a particular gateway device to a particular service provider until the gateway is deployed and in the hands of the user provides additional flexibility in the gateway device supply chain, increases the number of security options and protocols, and allows for the various models by which different or varying combinations of gateway device manufacturers, system service providers, service management center operators, and application service providers may deploy the novel architecture and the services it provides.

In one exemplary embodiment, the activation manager 1141 is isolated from the rest of the service management center 201. The activation service, being a separate service which may or may not reside/operated within or by the service management center, maintains the activation state and activation configuration for each gateway. In a novel feature of this architecture, the activation manager 1141 may optionally be provisioned, so that it is outside and wholly independent of the service management center framework (see activation manager 1141*a* of FIG. 5). In that configuration, the activation manager 1141*a* may serve gateway devices during activation independent of the particular service management center to which the gateway belongs. The activation center is able to communicate with any number of service management centers to associate the deployed gateway devices with a particular service center based on the activation certificate assigned to the gateway. One skilled in the art recognizes that this approach has several advantages including, but not limited to, the ability to scale the activation manager 1141*a* function separately from the rest of the service management center 201 and to ease demand on network elements by separating activation demands from the service delivery demands. A further advantage is that, with the separation of the activation process from the system connectivity, authentication and authorization, the gateway device completes its initial security authentication and authorization process before being directed to a service management center, increasing the likelihood that only properly activated devices communicate with the service management center. Moreover, the activation manager 1141*a* may then be managed by an entity separate from the service management center provider. In one example, the manufacturer of the gateway may control the activation manager operations with respect to gateways associated with any number of service management centers each of which may be operated by independent service providers, in which case the activation manager operations are not be limited to serving any one management center. Thus, it is a further inventive aspect of this novel architecture, and the robust capabilities of the gateway device, that the gateway device is agnostic to the system service center operator and the application service provider. The gateway device may be deployed in the foregoing manner without the requirement that, upon manufacture, it be dedicated to, and capable of being activated by, only one devoted service provider.

The authentication manager 1124, as seen in FIG. 5, is responsible for authenticating gateway device 10, the user of the gateway device, and the application services associated with that gateway device 10. The authentication manager 1124, also is responsible for generating, renewing, and storing each service authentication key, voice services key, and web services key for a particular gateway device 10. Finally, the authentication manager 1124 is responsible for storing and verifying the user's activation state in database server 1127.

What follows is a description of the activation process as performed by the interaction between the gateway device 10 and service management center 201. This description describes the "success path" for activation and is sufficient that one skilled in the art could assemble or implement the gateway and service center hardware and software to enable the activation success path and error paths accounting for error scenarios (e.g. a corrupted IP packet containing the activation request message).

Activation begins when the gateway device 10 is manufactured. During the manufacturing process, the gateway device 10 is assigned a unique serial number, a public key certificate (also called the activation certificate) signed by, optionally, application service provider 98 (which may be, for example, the manufacturer of the gateway device, or the network service provider (or the operator of the service management center), and a private key. The unique serial number is a random number that identifies the gateway device 10. The private and public keys are used for verification and security purposes so that service management center 201 can verify that the gateway device 10 possesses the private key associated with the public key in the certificate and thereby maintain a secure platform. The unique serial number, public key certificate, and the private key are stored on the gateway device 10. The storage may be on non-volatile, read-only memory such as hard drive 154 (FIG. 4A). The public key certificate certifies the gateway device 10 as being trusted by, as appropriate, the activation manager operator, the system/network service provider, the service management center operator, or the application service provider 98 and, as such, must be non-transferable by cryptographically locking the certificates to the gateway device 10 on which it resides.

When an end user orders the gateway device 10 and subscribes to the application services provided by application service provider 98, the end user selects a user identifier. The user identifier is a unique identification sequence that associates the gateway device 10 with a particular end user. At the time of order, the user identifier, the serial number of the gateway device, and the subscribed application services are provisioned within the assigned service management center's database servers 1127. At this point in the activation process, the end user is associated with a user identifier that is associated with a specific gateway device 10 signed by, as appropriate, the activation manager operator, the system/network service provider, the service management center operator, or the application service provider 98 through the public key certificate.

Optionally at the time of order, an end user can be issued an activation code. The activation code is an additional security method that may be implemented. Specifically, an activation code may be used during the activation process, so that the end user is prompted to enter the activation code at some point during the activation process in order to activate the gateway device 10. For security purposes, the activation code should be delivered in a separate correspondence with the end user, preferably, delivered to the end user's billing address. If an end user is given an activation code, then this code is also provisioned within the service management center's database server 1127 (FIG. 5). The activation code may also be used to validate the association of the end user with the assigned gateway device, and vice versa.

Upon receipt of the gateway device 10, the gateway is not activated. The end user plugs a network connection into the gateway device 10. Once the network cable is connected, the gateway device 10 configures the WAN Termination 336 (FIG. 2) and thereby gains access to the WAN 338 (FIG. 2). In the exemplary system, the WAN is an IP network 99 (FIG. 1). One skilled in the art will recognize that this configuration can be performed by using DHCP or in any number of other common methods (e.g. static IP address provisioning).

Figure 6:
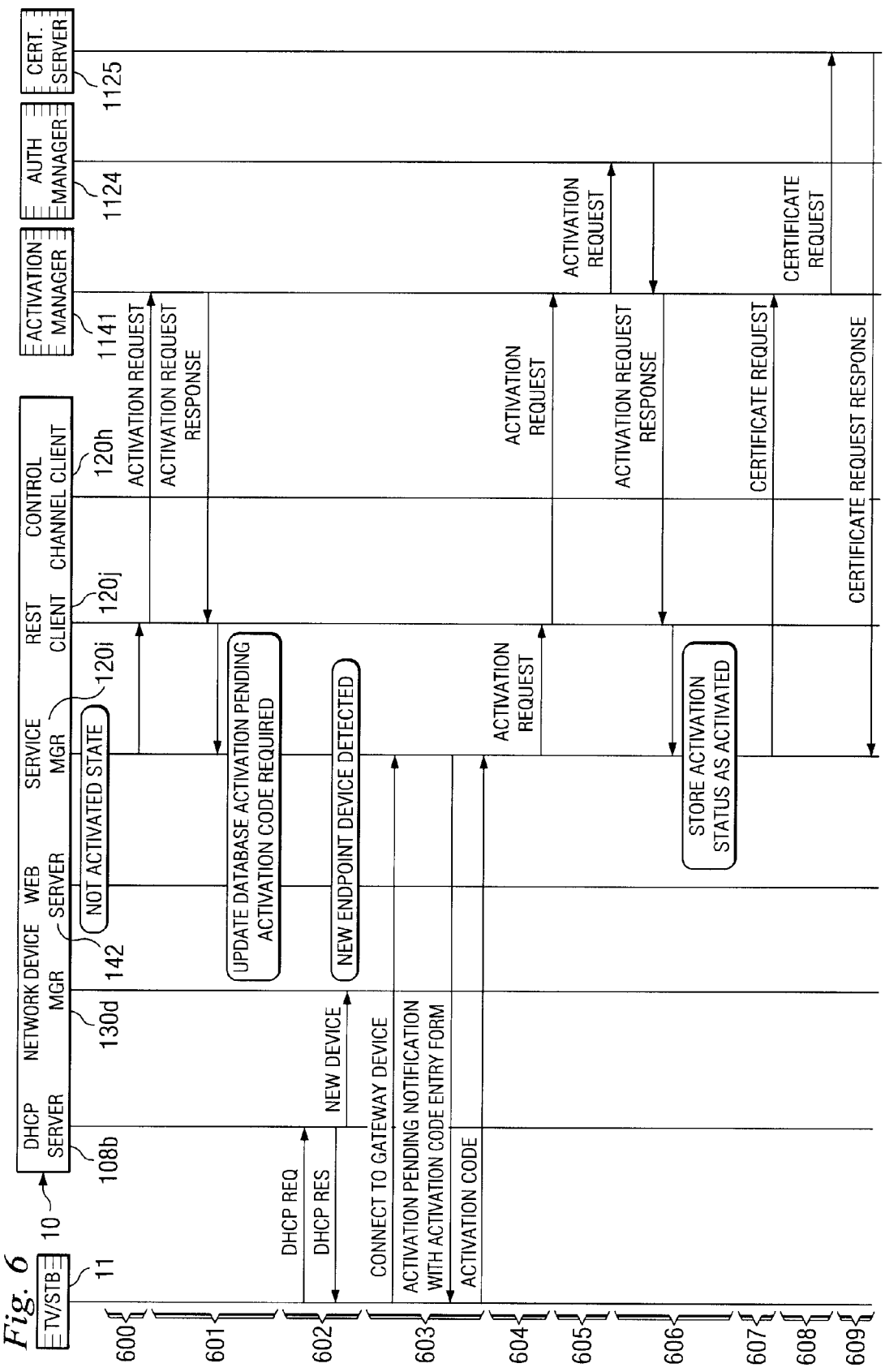
FIG. 6 is a data flow diagram of an embodiment of the activation process for an exemplary gateway device at the user premises once the gateway device is configured to an IP network.

FIG. 6 is a data flow diagram of an embodiment of the activation process of gateway device 10 at the user premises once gateway device 10 is configured to, as an example, the IP network 99 (FIG. 5). In step 600, the service manager 120*i* sends an activation request to the REST client 120*j*. The REST client 120*j* forms a Hyper-Text Transfer Protocol with Secure Socket Layer (HTTPS) connection with the activation manager 1141 across WAN 338 by utilizing the web service interface 149 (FIG. 4*b*). This HTTPS connection allows the gateway device 10 to send the activation request to the activation manager 1141. The activation request may include the public key certificate and the unique serial number of the gateway device 10. The activation manager 1141 then verifies the gateway's public key certificate ensuring that the certificate is signed by an application service provider 98 and that the gateway possesses the private key associated with the public key in the certificate. The activation manager 1141 interacts with database server 1127 for the assigned service management center holding identification information for every gateway device 10 in order to verify once communications between the service management center and the gateway device are established whether: (a) the information sent from this particular gateway device 10 is correct; and (b) that the gateway device is in fact associated with the assigned end user and the particular service management center. One skilled in the art will be familiar the software tools used, such as OpenSSL, that are capable of performing this verification by activation manager 1141 through interacting with database server 1127.

The next step in the activation process differs at this point depending upon whether an activation code was issued for the particular gateway device 10 requesting activation. If the end user was provided with an activation code, the activation manager 1141 transmits via the HTTPS connection a request for the activation code to the gateway device 10 shown within step 601 on FIG. 6. At this point, as shown in step 601 of the activation process, the gateway device 10 is in a status called activation pending and will remain in that status until the activation code is entered by the end user.

The end user typically enters the activation code through an endpoint device 11. Specifically, in step 602 of FIG. 6, the endpoint device 11 (here being the combination of set top box 35*a* with the television display device 32 discussed in FIG. 1) is first detected by the gateway device's service manager 120*i* because the endpoint device 11 is requesting an IP address through, for example, a DHCP request. The service manager 120*i* responds by assigning the endpoint device 11 an IP address. In this example the gateway acts as the router and DHCP server in the customer premises and provides the IP address. The endpoint devices, using various well-known mechanisms and protocols, then identify the gateway device and start communication with it. At step 603, the endpoint device 11 after being connected to the gateway device 10 realizes that the gateway device 10 is in an activation pending status. In the example shown in FIG. 6 at step 603, when the user attempts to use any services on the endpoint device 11, the web interface 142 recognizes that the gateway device 10 is in an activation pending state and thereby presents the user with an activation screen asking the user for his activation code. Upon entry of the activation code into the endpoint by the end user, the code is transmitted back to the gateway device 10 where the web server 142 captures the activation code and sends the code to the service manager 120*i*, which in turn forwards this to the activation manager via the web services interface 149. The foregoing example for endpoint device presentation uses a web-based technology, although the presentation method may use other technologies as well, including by way of example, STB- or DMA-specific presentation methods or protocols (proprietary and otherwise).

It should be noted that other application interfaces of layer 140 from FIG. 4 may be used instead of the web server 142 in order to prompt the end user for the activation code. For example, if the endpoint device 11 had been a SIP phone 40, then the SIP interface 141 would have recognized the gateway was in an activation pending state, prompted the user for the activation code, and subsequently sent the code onto service manager 120*i*.

At step 604, the service manager 120*i* resends the activation request to the REST client 120*j*. Utilizing the web services interface 149, the REST client 120*j* forms the HTTPS connection with the activation manager 1141. As previously mentioned, the HTTPS connection allows the gateway device 10 to send the activation request to the activation manager 1141. This activation request would include the public key certificate, the unique serial number of the gateway device 10, and the activation code. The activation manager 1141 then verifies the gateway's public key certificate (issued, for example, in accordance with established or known standards) ensuring that the certificate is signed by, as appropriate, the manufacturer, the operator of the activation manager, the system service provider, the service management center operator, or an application service provider 98 and that the gateway possesses the private key associated with the public key in the certificate. The activation manager 1141 verifies this certificate by reference to the public key certificate information for every gateway device 10 in order to confirm the identity of the gateway and the validity of the public key certificate.

The above referenced the use of an activation code. If the end user was not provisioned an activation code when ordering the gateway device 10, then the activation process does not involve any aspects relating to the use of an activation code discussed above including prompting the end user with a screen requesting the activation code. In the case of no activation code, step 603 would not include prompting the end user for the activation code, but instead just involve the connection of the endpoint device 11 to the gateway device 10.

Once the activation manager 1141 verifies the gateway device's 10 public key certificate, the activation manager 1141, at step 605 in FIG. 6, sends the activation request to the authentication manager 1124 of the appropriate service management center in order to activate the gateway device 10. The activation request sent by the activation manager 1141 may include the unique serial number of the gateway device, the public key certificate, and, if applicable, the activation code. The authentication manager 1124 of the appropriate service management center uses the database server 1127 to verify the current authorization information sent within the activation request.

Assuming the authentication manager 1124 of that service management center is able to verify the information sent within the activation request, the authentication manager 1124 generates a service authentication key to confirm that the gateway device is activated, authenticated as part of the network, and thereby, be able to receive system services and connectivity through the control channel with the appropriate service management center. The authentication manager 1124 stores the key in the database server 1127 and also marks the gateway device 10 as activated in the database server 1127. At step 606 of FIG. 6, the authentication manager 1124 of that service management center passes the service authentication key to the activation manager 1141 (or 1141*a*) which then sends the service authentication key and the subscription information with the domain names of several services within the service management center 201 over the HTTPS connection to the gateway device 10. The service manager 120*i* of gateway device 10 saves the key and domain on gateway device 10, such as, by way of example, in hard drive 154. In this way, authorization for receiving services is obtained through the gateway device without having to resort to network resources or assets. Also, the service manager 120*i* marks the gateway device 10 as activated. In addition, the gateway device 10 is now configured to properly interact and communicate with the service management center. At this point in the activation process, the activation manager informs the gateway device of the service management center details, and the gateway device then established connectivity and communication with the service management center. After reference is made to the database server 1127 and the identification information residing thereon, the gateway device's application service is associated with a specific application service provider(s) 98.

At step 607 of FIG. 6, the service manager 120*i* generates a private and public key pair and requests a gateway authentication certificate from the activation manager 1141. The activation manager 1141 forwards this certificate request at step 608 to the certificate server 1125. The certificate server 1125 confirms and validates, through the activation manager: (1) that the gateway device it has a valid activation certificate; (2) that the gateway device is to be placed on the network for that particular service management center; (3) the identity of that particular gateway device; (4) the user of the gateway device; (5) that the user is properly associated with the particular gateway device; (6) that the gateway device is authorized to receive a particular suite of services from the application service provider 98. Thus, while the gateway device is authenticated and validated by the activation manager, the certificate server authorizes and ensures that the certificate request is originated only from the gateway device. Lastly, step 609 of FIG. 6, involves the certificate server 1125 issuing a gateway authentication certificate for the gateway device 10 and subsequently sending that certificate back to the activation manager 1141 which in turn forwards the certificate to the service manager 120*i*. This final step completes the activation process.

The final step of this end-to-end activation process provides the gateway authentication certificate that transfers the application service provider's trust to the gateway device 10 and thereby completing the trust chain from the factory through end user provisioning and activation to the gateway device 10 and its endpoint devices 11. By delivering the gateway authentication certificate to the gateway device 10, the system architecture eliminates the need for a gateway authentication certificate residing on the certificate server 1125 within the service management center 201. The gateway authentication certificate is used whenever an endpoint device 11 accesses the gateway device 10 and assures the endpoint device 11 that the gateway device 10 is trusted by the application service provider 98. Because the gateway authentication certificate resides on the gateway device 10, efficiency is achieved within the exemplary system as endpoint devices 11 can trust activated gateway devices 10 without having to access the application service provider 98 through the service management center 201 to determine whether to trust gateway device 10. Additionally, through the gateway authentication certificate, the gateway device 10 is enabled to generate its own certificates that can be presented to other gateway devices 10 to allow peer-to-peer communication between multiple gateway devices 10.

After activation, the gateway device 10 performs service initialization. Service initialization refers to the process of configuring and authorizing a gateway device with respect to a particular, designated service management center to use particular application services provided by application service provider 98. The service initialization process for each application service consists of service configuration download, and when required in connection with a service requiring a subscription, a service authentication key.

Figure 7:
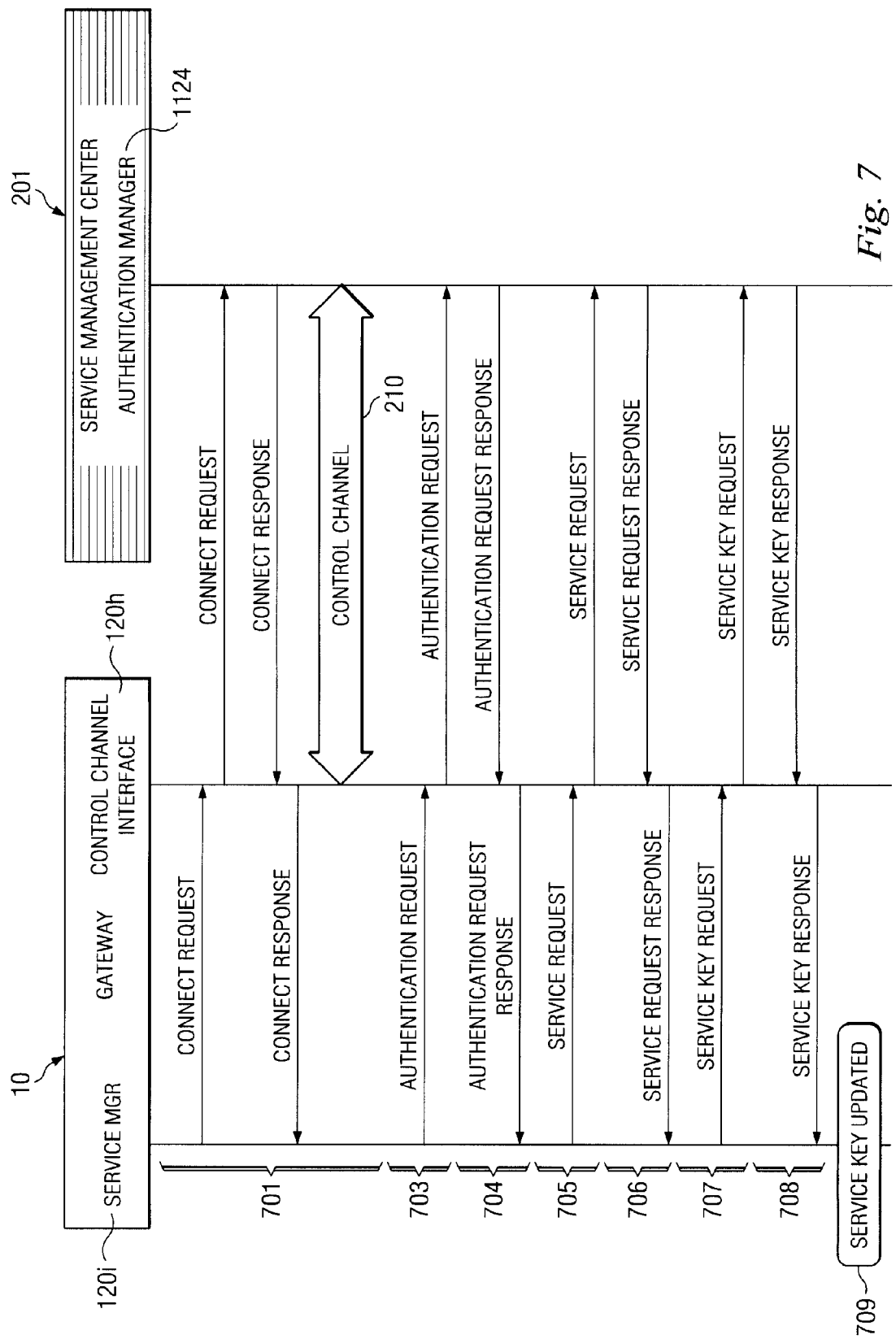
FIG. 7 is a data flow diagram of an embodiment of the service authentication key renewal process for an exemplary gateway device at the user premise.

FIG. 7 is a data flow diagram of an exemplary embodiment of the service key renewal process for the gateway device 10 at the user premise. The first step in service key renewal is authentication of the gateway device 10. Authentication is referred to as the process of identifying an entity, such as gateway device 10, to determine if the entity is who it says it is. After activation or whenever service needs to be re-established, the gateway device 10 is authenticated. As illustrated in FIG. 7 at step 701, the gateway's control channel interface 120*h* sends and receives a connection request to create a Transmission Control Protocol (TCP) on Transport Layer Security (TLS) connection (i.e. control channel 210) with the presence and networking infrastructure 1106 in the service management center 201 shown in FIG. 5. For the establishment of the control channel, the gateway is authenticated by the authentication manager in the service management center. The process of authentication of the gateway can be done by various cryptographic techniques well known to those skilled in the art. Thus, after the establishment of the control channel 210, at step 702 of FIG. 7, the gateway encrypts certain data and sends the encrypted data in what is referred to as an authentication request to the service management center 201 across the control channel 210. Through the presence and networking infrastructure 1106 this authentication request is sent to the authentication manager 1124 (step 703). The authentication manager 1124 verifies that the gateway device 10 is activated and using a stored service authorization key in database server 1127, verifies that the encrypted data is correct. Assuming the authentication manager 1124 verifies the gateway device 10 is activated and that the encrypted data have integrity, the authentication manager 1124, at step 704, responds to the presence and networking infrastructure 1106 indicating that the gateway device 10 is authenticated. In turn, the presence and networking infrastructure 1106 responds to the gateway device 10 and the gateway's control channel interface 120*h* marks the control channel 210 connection as up and raises a notification event to the service manager 120*i*. This initialization process authenticates and authorizes the gateway for system service, e.g., connectivity and association with the designated service management center, so that all system service authorization and authentication information may be made available to the gateway device, and, in turn, the gateway device may be controlled by the properly associated service management center.

Once the gateway device 10 has been authenticated, as mentioned earlier the service initialization process may optionally involve service key renewal and service configuration. With respect to service key renewal, the service manager 120*i* is responsible for the management and storage of the service authentication key for application services such as, for example, web service, voice service, movie service, music service, file-sharing service, file-backup service, gaming service, advertising service, food-ordering service, and other application services. The service authentication key was previously described above with respect to the activation process. The web service key, the voice service key, and other service keys, which are similar to the service authentication key, but as regards a particular application service, are used whenever a gateway device 10 has to be authenticated such as, for example, when conducting a web based or voice transaction or accessing the service management center 201. Thus, the management of these key is critical to the ability of gateway device 10 to provide application services.

As seen in FIG. 7 at step 705, when the user makes an application service request through the gateway device, the service manager 120*i* sends a service request for application services to the service management center 201. With each application service request made by the user through the gateway device, the service manager 120*i* has to provide a valid service key to the service management center to prove that it is authorized for the application service requested by the user. Generally, these service keys are used for application service requests. Each of these keys, which include, by way of example, the service authentication key, web service key, and voice service key have parameters that limit their validity. The service manager 120*i* is responsible for requesting renewal of these keys when these keys no longer have valid parameters. It should be noted that by periodically requiring the renewal of the service specific keys, the consequences of the revelation of any single key to an outside entity are limited to the circumstances specified by the parameters that confer validity to the key. Therefore, by limiting the validity parameters of the key, a service hacker is less willing to expend resources attacking the system.

At step 706, the authentication manager 1124 has responded to the service manager 120*i* that the particular key for the service has, for example, expired. To request a new key as seen in FIG. 7 at step 707, the service manager 120*i* sends a service key request message to the authentication manager 1124 (FIG. 5) through the control channel interface 120*h* transiting the presence and networking infrastructure 1106. At step 708, the authentication manager 1124 (FIG. 5) either uses the same key or generates a new one when renewing the expired service key. The authentication manager 1124 sets the new expiration time for the service key and returns the service key with the expiration time to the gateway device 10 using the control channel 210. Finally, at step 709 the service manager 120*i* of the gateway device 10 receives the updated service key and stores the key on the gateway device 10 such as on hard drive 154. With the updated service key, the gateway device 10 and its associated endpoint devices 11 can access application services specified by the updated key.

Figure 8:
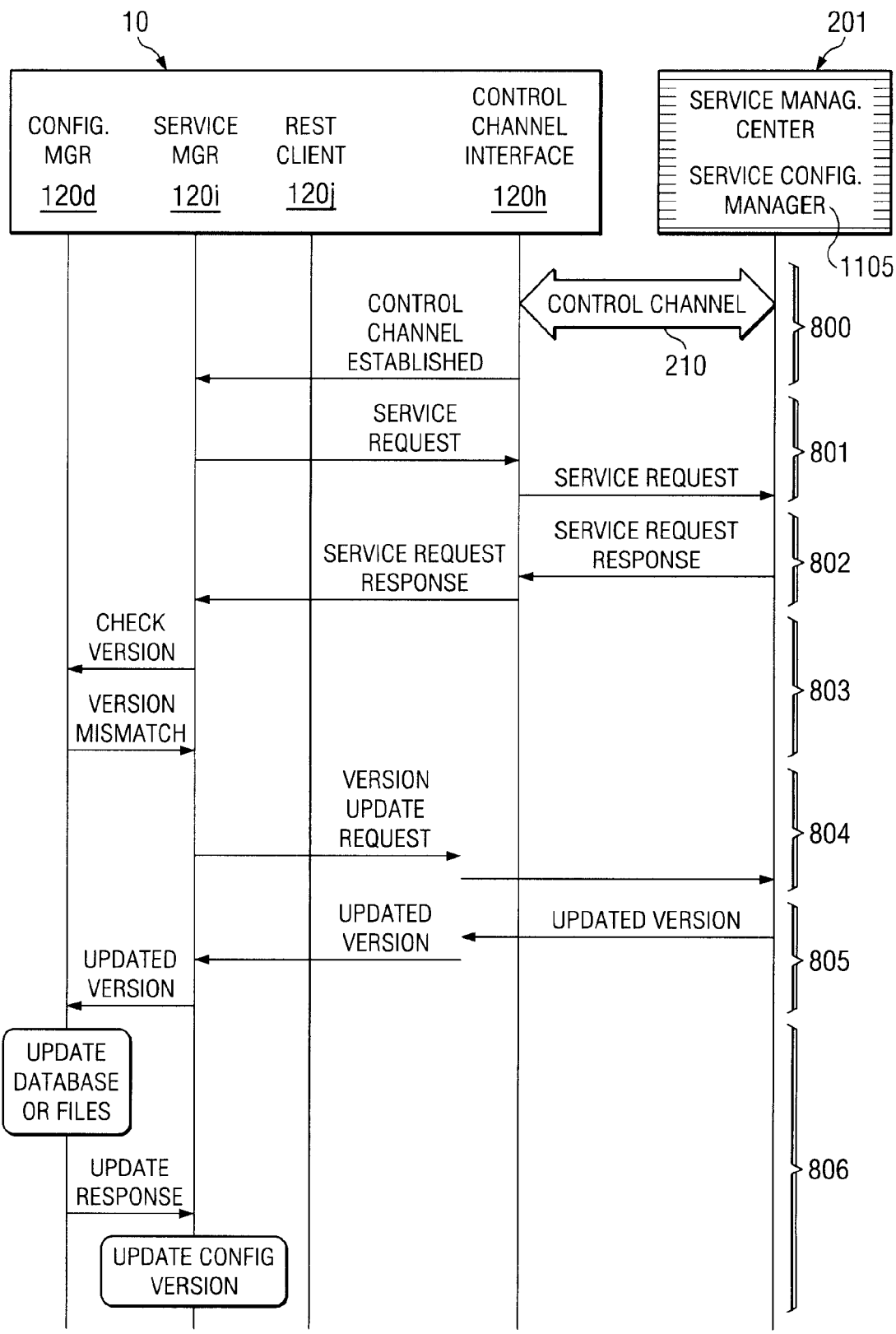
FIG. 8 is a data flow diagram of an embodiment of service and feature subscription synchronization and the renewal of service authentication keys.

While the service keys and service authentication key are used to authenticate the gateway device's access to application services, the gateway device 10 itself is the primary authorization enforcement point for the user and the user's endpoint devices 11 for accessing an application service. Authorization is referred to as the process of determining whether the gateway device 10 and/or an endpoint device 11 is authorized to the use a particular application service. FIG. 8 is a data flow diagram of an embodiment of the process for authorization of the gateway device 10 at the user premises through service configuration updates. The gateway device's service manager 120*i* manages the enforcement of service authorization by ensuring that service configuration information is up to date. Through updating the configuration information on gateway device 10, authorization is effectively handled because the gateway device 10 and its associated endpoints 11 would be updated with respect to their ability to access and use a particular application service.

The service manager 120*i* becomes apprised of pending configuration updates in two ways. First, as shown in FIG. 8, any time when the control channel 210 is established (step 800) including service initialization time, the service manager 120*i* at step 801 sends a service request message to the service configuration manager 1105 of service management center 201. Referencing FIG. 5, the service request is sent through control channel 210 to the presence and networking infrastructure 1106 until reaching service configuration manager 1105. In response to the service request, the service configuration manager 1105 responds with data concerning the current version of configuration information for a particular application service as seen in step 802 in FIG. 8. The information concerning the current version of the configuration information is transmitted back to gateway device 10 through control channel 210. Upon receipt of information concerning the latest configuration information, at step 803, the configuration manager 120d of gateway device 10 checks the version of the configuration information received against the configuration information version installed on the gateway device 10. If the configuration manager 120d determines the gateway device 10 has the most current version of the configuration information then the configuration update ends. However, if the configuration manager 120d determines the gateway device 10 does not have the most current version of the configuration information installed then the configuration manger 120d at step 804 requests through the service manager 120i the most current version of the configuration information. The service manager 120i sends the request through control channel 210 to the service configuration manager 1105 within service management center 201. In turn, as shown as step 905, the service configuration manager 1105 send the requested version of the configuration information back to the gateway device 10 across the control channel 210. Upon receipt of the most current version of the configuration information, at step 806 the configuration manager 120d updates the appropriate modules within gateway device 10 and notifies the service manager 120i of the update. This last step ends the first method of how service manager 120i becomes apprised of pending configuration updates and subsequently receives them.

The second method of how the service manager 120i becomes apprised of pending configuration updates occurs when a configuration change is introduced in the service management center 201 and the gateway device already has its control channel 210 established. In this scenario, referring to FIG. 5, the service configuration manager 1105 notifies the publisher/subscriber (Pub/Sub) server 1113 of a configuration update. The Pub/Sub server 1113 determines which gateway devices 10 have the early version of the configuration information and sends a notification containing the new configuration version to the gateway devices' service manager 120i transiting the presence and networking infrastructure 1106. If the gateway device has a previous version of configuration information, the service manager 120i of the gateway device 10 follows steps 802-806 as described above with reference to FIG. 8 in order to update the version of the configuration information on the gateway device 10. If on the other hand, the gateway device 10 determines it has the most up to date version of the configuration information, then the configuration update ends and steps 802-806 of FIG. 8 are not performed.

It should be noted that the gateway device 10 performs the service initialization processes which includes service key renewal and configuration information update any time it requires initial service establishment and/or service re-establishment. For example, if the gateway device 10 is disconnected from IP Network 99 (FIG. 1) the gateway detects this loss of connectivity and puts itself in a disconnected state. When the gateway device 10 is reconnected, the gateway not only follows the activation process described above, but also follows the service initialization process described herein to re-establish service.

With further respect to FIG. 5, the architecture of service management center 201 is composed of various layers that provide the security and service architecture required to support the various gateway devices 10. This layered architecture is a way to group the functional components into logical related grouping. The layered architecture as seen in FIG. 5 is made up of the following layers: access, load distribution, and security layer (ALDS) 1163, externally accessible service (EAS) layer 1164, VoIP support layer 1165, internal services support (ISS) layer 1166, system support (SS) layer 1167, and network management (NM) layer 1168.

The equipment in the ALDS layer 1163 provides the public interfaces addressable from the public Internet through the IP access routers 1152 connecting the service management center 201 to gateway device 10 across IP network 99. This layer contains all devices that will be the initial entry point of all traffic entering the service management center 201. The ALDS layer 1163 provides security, access control, and load balancing of traffic directed to the service management center 201. Furthermore, the ALDS layer 1163 may use network address translation to provide virtual public IP addresses that map to servers located in the externally accessible service interface layer 1164.

The components of the ALDS layer 1163 provide safe access into the service management center 201 by, 1) only mapping well-known connection ports to listening servers, 2) providing port based network address translation (PAT) from the public access network to the private service management center 201 network, 3) protecting the internal application servers from attacks on accidentally open ports, and 4) screening for protocol bugs that allow illegal access into applications.

The EAS layer 1164 contains servers that can be accessed by devices external to service management center 201 such as gateway device 10. Specifically, the servers comprising the EAS layer 1164 may include, for example, the activation manager 1141. The activation manager 1141 receives and processes a new gateway device's 10 activation request coordinating with the authentication manager 1124 and the certificate server 1125 to authenticate and provide keys and certificates for the activated gateway.

The EAS layer 1164 contains the initial entry point for access into the ISS layer 1166 to provide services to the gateway device 10. For example, the servers within the EAS layer 1164 may provide access for Internet based services, like email and remote user access. Additionally, the servers in the EAS layer 1164 may be grouped into server farms and load balanced using the server load balancer 1149 in the ALDS layer 1163.

The VoIP support layer 1165 may comprise of servers supporting voice services within the exemplary architecture. For example, the VoIP support layer 1165 may process session initiation protocol (SIP) voice calls by performing end user authorization using the authentication manager 1124 and redirect the SIP call to the users location (i.e. IP address). The equipment in the VoIP Support layer 1165 is protected from access from the Internet via the session border controller 1151 located in the ALDS layer 1163.

The ISS layer 1166 provides the functional support for the application services available to the gateway device 10. All service requests from the gateway device 10 enters though the EAS layer 1164 prior to being processed by the functions residing in the ISS layer 1166. The equipment in the ISS layer 1166 may include, but not limited to, service configuration manager 1105, authentication manager 1124, certificate server 1125, database server 1126, and billing collector 1111. The service configuration manager 1105 maintains the subscribers' service information used to configure the gateway device 10 and its associate endpoint devices 11. The authentication manager 1124 receives requests to authenticate the gateway device 10 and the services the subscribers use. The certificate server 1125 creates signing certificates for the gateway device 10 and its associated endpoint devices 11. The database server 1127, for example, is the database for the service configuration manager 1105, the authentication manager 1124, the presence and networking infrastructure 1106, and the activation manager 1141. The billing collector 1111 collects billing records.

The SS layer 1167 provides the services that are used internally within the service management center 201. For example, the SS layer 1167 may provide a timing server to synchronize the internal architecture within the service management center 201. The internal services provided by the SS layer 1167 can be used by all other internal layers of service management center 201, but are not accessible by the gateway device 10.

The equipment comprising the NM layer 1168 may include, but not limited to, the network management system 1109 and alarms and statistics aggregator 1108. The network management system 1109 is a collection of computer equipment that receives and manages alarms and statistics for the service management center 201 and the gateway device 10 and its associated endpoint devices 11. The alarms and statistics aggregator 1108 processes the statistic and alarm feeds from all gateway devices 10 and all other servers and sends them to the network management system 1109.

The NM layer 1168 provides the support for access to and management of operational information from other components of the service management center as well as gateway device 10 and its associated endpoint devices 11. In addition, the NM layer 1168 may contain the access point for the network operations center 1169 and subsequently application service provider 98 into the infrastructure of the service management center 201.

Additional components of the service management center 201 include the network operations center 1169, the presence and networking infrastructure 1106, publisher/subscriber server 1113, and IP access routers 1152. The network operations center 1169 is a location containing computers used by network support personnel for managing the service management center 201. The presence and networking infrastructure 1106 maintains the control channel 210 to the connected gateway device 10 to route command and control messages between the gateway device 10 and the support servers within the service management center 201. The publisher/subscriber server 1113 allows the servers in the service management center 201 to subscribe gateway devices 10 and its associated endpoint devices 11 to topics and send notifications to gateway devices 10 and its associated endpoint devices 11 which have subscribed to a topic. The IP access routers 1152 are the routers that terminate the physical interfaces to the IP network 99 and route IP packets to and from the service management center 201.

The gateway device 10 and its interactions with various endpoint devices 11, service management center 201, and application service provider 98 have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more systems implementing functions of the service management center 201. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of as "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device 10 or associated modules thereof or any of the hardware platforms as may be used in the service management center 201, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from gateway device 10 or from another source into an element of the service management center 201. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers 98 to provide multiple application services independently. Application services are managed by the application service provider 98 through the service management center 201, meaning, generally, authorizing, provisioning, and monitoring the usage of a particular application service. This can be accomplished in a variety of ways with varying degrees of involvement of, or coordination with, the service management center 201. The service management center 201 could manage these items "soup-to-nuts" or have minimal involvement. For example, the service management center 201 could deal directly with the third-party application service provider 98 to acquire application services at the request of a user and manage the delivery, authorization, usage-monitoring and upgrading of the application service. At the other end of the spectrum, a service provider may have arrangements with the third-party application service provider 98 by which orders or requests from the users may come directly to the third-party application service provider 98, and services are delivered to the user by the third-party service provider who in turn coordinates with the managed service provider to register and monitor the particular application service placed in the gateway device 10. It should be noted that this ability to manage application services extends through the gateway device 10 into the endpoint devices 11 registered or associated with the gateway device 10 or service management center 201.

While embodiments of the invention have been illustrated and described in detail in the disclosure, the disclosure is to be considered as illustrative and not restrictive in character. All changes and modifications that come within the spirit of the invention are to be considered within the scope of the disclosure.

The foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of putting a first gateway device into service, the first gateway device having an application service module and a network module enabling communications between the first gateway device and an activation manager across a wide area network, the application service module controlled by an application services provider and residing on a user premises side of a network service provider demarcation, the method comprising:

providing the first gateway device in a non-activated state, wherein the first gateway device includes:
  a service manager configured to control an activation and authentication process of the first gateway device, the service manager further configured to associate an endpoint device and a user of the endpoint device with the first gateway device;
  a state manager configured to store a state status of the first gateway device that is utilized by the service manager in controlling the activation and authentication process of the first gateway device, wherein the state status is at least one of non-activated, activation pending, activated, and authenticated;
  a connection client configured to form a secure communication channel between the first gateway device and the activation manager across the wide area network; and
  a service interface module in communication with the connection client and configured to interface with the wide area network to form the secure communication channel between the first gateway device and the activation manager, the service interface module further configured to provide activation status indications to the endpoint device associated with the first gateway device;

assigning to the first gateway device a unique serial number, an activation certificate, a private key, and an activation code, wherein the unique serial number, the activation certificate, the private key, and the activation code are all different from each other, wherein the activation certificate certifies that the first gateway device is trusted by the activation manager;

initiating, by the service manager of the first gateway device, the activation and authentication process independent of the user of the endpoint device performing any user navigation steps on a user interface associated with either the endpoint device or the first gateway device;

forming, by the connection client of the first gateway device, the secure communication channel between the first gateway device and the activation manager across the wide area network by utilizing the service interface module;

sending, by the first gateway device, a first activation request to the activation manager via the secure communication channel for activation and authentication of the first gateway device, the first activation request including the unique serial number and the activation certificate;

determining by the activation manager, after the sending of the first activation request to the activation manager, that the user of the endpoint device was provided the activation code;

sending, by the activation manager, a request for the activation code to the first gateway device via the secure communication channel;

sending, by the endpoint device associated with the first gateway device, the activation code to the service interface module of the first gateway device;

sending, by the service manager of the first gateway device, a second activation request to the activation manager via the secure communication channel, the second activation request including the unique serial number, the activation certificate, and the activation code received from the endpoint device;

verifying, by the activation manager, the first gateway device using the unique serial number, the activation certificate, and the activation code from the second activation request;

sending, by the activation manager, the second activation request to an authentication manager after the first gateway device has been verified by the activation manager in order to activate and authenticate the first gateway device;

verifying, by the authentication manager, the first gateway device using the unique serial number, the activation certificate, and the activation code from the second activation request;

generating, by the authentication manager, a service authentication key associated with the first gateway device after the first gateway device has been verified by the authentication manager to confirm that the first gateway device is activated and authenticated;

storing the service authentication key and an indication that the associated gateway device status is activated in a database, the database being external to the user premises;

determining a subscription information of the first gateway device, the subscription information includes application services available to the first gateway device provided by the application service provider;

sending, by the activation manager, the service authentication key and an identification of the available services to the first gateway device;

after the first gateway device has received the service authentication key, sending, by the service manager of the first gateway device, a gateway authentication certificate request to the activation manager via the secure communication channel; and sending, by the activation manager, a gateway authentication certificate to the first gateway device, the gateway authentication certificate representing transfer of the application service provider's trust to the first gateway device such that whenever the endpoint device accesses the first gateway device the gateway authentication certificate assures the endpoint device that the first gateway device is trusted by the application service provider.

2. The method of claim 1, further comprising:
sending, by the activation manager, the gateway authentication certificate request to a certificate server;

issuing the gateway authentication certificate by the certificate server and sending the gateway authentication certificate to the activation manager, the gateway authentication certificate to be used to for peer-to-peer authentication of a second gateway device.

3. The method of claim 1, further comprising:
sending, from the activation manager, the gateway authentication certificate request for the gateway authentication certificate to a certificate server;
verifying, by the certificate server, the first gateway device and generating, once verified, the gateway authentication certificate for the first gateway device; and
sending, from the certificate server, the gateway authentication certificate to the activation manager;
sending, from the activation manager, the gateway authentication certificate to the first gateway device; and
presenting, by the first gateway device, the gateway authentication certificate to the endpoint device accessing one of the application services available to the first gateway device that is provided by the application service provider through the first gateway device to assure the endpoint device that the first gateway device has the trust of the application service provider.

4. The method of claim 1, further comprising:
issuing the activation code to the user of the endpoint device at a time of ordering the first gateway device by the user, the activation code associated with and unique to the user and the first gateway device;
receiving at the endpoint device, from the first gateway device, the request for the activation code; and
prompting, by the first gateway device, the user for the activation code independent of the user invoking any service or navigation requests on the user interface associated with either the endpoint device or the first gateway device.

5. The method of claim 1, wherein generating a service authentication key comprises generating the service authentication key at the authentication manager.

6. The method of claim 1, further comprising associating the first gateway device with the application service provider.

7. The method of claim 1, further comprising sending, from the activation manager, the gateway authentication certificate request to a certificate manager for issuance of the gateway authentication certificate.

8. The method of claim 1, further comprising directing the first gateway device to the application service provider in response to the identification of the available services to the first gateway device.

9. The method of claim 1, wherein the activation manager is external to the user premises and independent of any application service provider.

10. The method of claim 1, further comprising:
establishing a connection, at the first gateway device, to a remote service manager;
sending, from the first gateway device, an authentication request for an application service based on the identified available services to the remote service manager, the request including the service authentication key associated with the application service;
sending the authentication request, including the service authentication key, to the authentication manager;
verifying, by the authentication manager, the service authentication key and that the first gateway device status is activated; and
thereafter accessing the application service by the first gateway device using the verified service authentication key.

11. The method of claim 1, wherein generating a service authentication key further comprises generating a key for application services.

12. The method of claim 1, wherein generating a service authentication key further comprises generating at least one service key for at least one of web service, voice service, movie service, music service, file-sharing service, file-backup service, gaming service, advertising service, and food-ordering service.

13. The method of claim 1, wherein generating a service authentication key further comprises generating the service authentication key with a validation parameter, the validation parameter specifying a circumstance under which the service key is valid.

14. The method of claim 1, wherein generating a service authentication key further comprises generating a new service authentication key on a periodic basis.

15. The method of claim 1, further comprising sending a renewal request to renew the service authentication key.

16. The method of claim 1, further comprising sending a current service configuration to the first gateway device.

17. The method of claim 1, wherein generating a service authentication key comprises generating a plurality of service authentication keys for a plurality of gateway devices.

18. A system comprising:
a remote service manager coupled to a network;
an activation manager coupled to the network, the activation manager being independent of the remote service manager, the activation manager operable to:
determine whether a user of an endpoint device was provided an activation code;
send a request for the activation code to a gateway device;
verify the gateway device using a unique serial number of the gateway device, an activation certificate, and the activation code sent to the activation manager from the gateway device;
communicate with an authentication manager after the gateway device has been verified by the activation manager in order to activate and authenticate the gateway device and receive a service authentication key; and
send the service authentication key and an identification of the available services to the gateway device;
the authentication manager in communication with the activation manager and operable to:
verify the gateway device using the unique serial number, the activation certificate, and the activation code sent from the activation manager to the authentication manager;
generate the service authentication key associated with the gateway device after the gateway device has been verified by the activation manager to confirm that the gateway device is activated and authenticated; and
send a gateway authentication certificate to the activation manager, the gateway authentication certificate representing transfer of an application service provider's trust to the gateway device;
the gateway device disposed at a user premises and in communication with the activation manager via the network, the gateway device comprises:
an application service module residing on a user premises side of a network service provider demarcation of the network;
a network module having a connection to the network that enables bi-directional communications with the activation manager;

a connection client configured to form a secure communication channel between the gateway device and the activation manager across the network; and a service interface module in communication with the connection client and configured to interface with the network to form the secure communication channel between the gateway device and the activation manager, the service interface module further configured to provide activation status indications to the endpoint device associated with the gateway device;

a storage operable to store the unique serial number, the activation certificate, a private key, and the activation code assigned to the gateway device, wherein the unique serial number, the activation certificate, the private key, and the activation code are all different from each other, wherein the activation certificate certifies that the gateway device is trusted by the activation manager;

a service manager operable to:
control an activation and authentication process of the gateway device;
associate an endpoint device and a user of the endpoint device with the gateway device;
initiate the activation and authentication process independent of the user of the endpoint device performing any user navigation steps on a user interface associated with either the endpoint device or the gateway device;
send a first activation request to the activation manager via the secure communication channel for activation and authentication of the gateway device, the first activation request including the unique serial number and the activation certificate;
send the request for the activation code to the endpoint device of the gateway device such that the endpoint device prompts the user for the activation code independent of the user invoking any service or navigation requests on a user interface associated with either the endpoint device or the gateway device;
send a second activation request to the activation manager via the secure communication channel in response to receiving the request for the activation code from the activation manager, the second activation request including the unique serial number, the activation certificate, and the activation code received from the endpoint device;
receive the service authentication key and the identification of available services to the gateway device from the activation manager using the network module;
send the gateway authentication certificate request to the activation manager via the secure communication channel after the gateway device has received the service authentication key, and
receive the gateway authentication certificate from the authentication manger, the gateway authentication certificate representing transfer of the application service provider's trust to the gateway device such that whenever the endpoint device accesses the gateway device the gateway authentication certificate assures the endpoint device that the gateway device is trusted by the application service provider;

a state manager configured to store a state status of the gateway device that is utilized by the service manager in controlling the activation and authentication process of the gateway, wherein the state status is at least one of non-activated, activation pending, activated, and authenticated, wherein the gateway device is unassociated with and non-managed by the remote service manager until the activation manager assigns the gateway device to the remote service manager.

19. A system comprising:
a remote service manager coupled to a network;
an application service provider coupled to the network;
an activation manager coupled to the network, the activation manager operable to:
verify a gateway device using a unique serial number of the gateway device and an activation certificate sent to the activation manager from the gateway device;
communicate with an authentication manager after the gateway device has been verified by the activation manager in order to activate and authenticate the gateway device and receive a service authentication key; and
send the service authentication key and an identification of the available services to the gateway device;
the authentication manager in communication with the activation manager and operable to:
verify the gateway device using the unique serial number and the activation certificate sent from the activation manager to the authentication manager;
generate the service authentication key associated with the gateway device after the gateway device has been verified by the activation manager to confirm that the gateway device is activated and authenticated; and
send a gateway authentication certificate to the activation manager, the gateway authentication certificate representing transfer of the application service provider's trust to the gateway device;
a gateway device disposed at a user premises and in communication with the activation manager via the network, the gateway device being agnostic to the remote service manager and the application service provider, the gateway device comprises:
an application service module residing on a user premises side of a network service provider demarcation of the network;
a network module having a connection to the network that enables bi-directional communications with the activation manager; and
a connection client configured to form a secure communication channel between the first gateway device and the activation manager across the network; and
a service interface module in communication with the connection client and configured to interface with the network to form the secure communication channel between the gateway device and the activation manager, the service interface module further configured to provide activation status indications to the endpoint device associated with the gateway device;
a storage operable to store the unique serial number, the activation certificate, and a private key, wherein the unique serial number, the activation certificate, and the private key are all different from each other, wherein the activation certificate certifies that the gateway device is trusted by the activation manager;
a service manager operable to:
control an activation and authentication process of the gateway device;
associate an endpoint device and a user of the endpoint device with the gateway device;

initiate the activation and authentication process independent of the user of the endpoint device performing any user navigation steps on a user interface associated with either the endpoint device or the gateway device;

send an activation request to the activation manager via the secure communication channel for activation and authentication of the gateway device, the activation request including the unique serial number and the activation certificate;

receive the service authentication key and the identification of available services to the gateway device from the activation manager using the network module;

send the gateway authentication certificate request to the activation manager via the secure communication channel after the gateway device has received the service authentication key, and receive the gateway authentication certificate from the authentication manger, the gateway authentication certificate representing transfer of the application service provider's trust to the gateway device such that whenever the endpoint device accesses the gateway device the gateway authentication certificate assures the endpoint device that the gateway device is trusted by the application service provider, a state manager configured to store a state status of the gateway device that is utilized by a service manager in controlling the activation and authentication of the gateway, wherein the state status is at least one of non-activated, activation pending, activated, and authenticated.

20. The method of claim 1, wherein assigning to the first gateway device the activation certificate includes assigning to the first gateway device the activation certificate during manufacturing of the first gateway device.

21. The method of claim 20, wherein assigning to the first gateway device the activation certificate during manufacturing of the first gateway device includes storing the activation certification in the first gateway device.

22. The method of claim 21, wherein the activation certificate includes a public key certificate that is cryptographically locked to the first gateway device.

23. The system of claim 19, wherein the remote service manager stores the gateway device's activation state, the activation state of the gateway device providing information relevant to whether a gateway is activated and able to be managed by the remote service manager, wherein the remote service manager stores configuration information of the gateway device, the configuration information representing a current configuration of the gateway device with respect to various application services and hardware resources associated with the gateway device, wherein the remote service manager stores location information of the gateway device, the location information represents a location of the gateway device within the network such that the gateway device can be accessed by using the location information;

wherein the remote service manager stores a service provider ID of the gateway device, the service provider ID identifies the application service provider that the gateway device has been associated with to provide application services to the gateway device, and wherein the remote service manager stores subscription information of the gateway device, the subscription information identifies application services provided by the application service provider that a user has subscribed to and thereby accessible by the gateway device.

24. A method comprising:

providing a gateway device in a non-activated state, wherein the gateway device includes:

a service manager configured to control an activation and authentication process of the gateway device, the service manager further configured to associate an endpoint device and a user of the endpoint device with the gateway device;

a state manager configured to store a state status of the gateway device that is utilized by the service manager in controlling the activation and authentication process of the gateway device, wherein the state status is at least one of non-activated, activation pending, activated, and authenticated;

a connection client configured to form a secure communication channel between the gateway device and an activation manager across a wide area network; and a service interface module in communication with the connection client and configured to interface with a wide area network to form the secure communication channel between the gateway device and the activation manager, the service interface module further configured to provide activation status indications to the endpoint device associated with the gateway device;

assigning to the gateway device a unique serial number, an activation certificate, and a private key, wherein the unique serial number, the activation certificate, and the private key are all being different from each other, wherein the activation certificate certifies that the gateway device is trusted by the activation manager;

initiating, by the service manager of the gateway device, the activation and authentication process independent of the user of the endpoint device performing any user navigation steps on a user interface associated with either the endpoint device or the gateway device;

forming, by the connection client of the gateway device, the secure communication channel between the gateway device and the activation manager across the wide area network by utilizing the service interface module;

sending, by the gateway device, an activation request to the activation manager via the secure communication channel for activation and authentication of the gateway device, the activation request including the unique serial number and the activation certificate;

verifying, by the activation manager, the gateway device using the unique serial number and the activation certificate from the activation request;

sending, by the activation manager, the activation request to an authentication manager after the gateway device has been verified by the activation manager in order to activate and authenticate the gateway device;

verifying, by the authentication manager, the gateway device using the unique serial number and the activation certificate from the activation request;

generating, by the authentication manager, a service authentication key associated with the gateway device after the gateway device has been verified by the activation manager to confirm that the gateway device is activated and authenticated;

determining a subscription information of the gateway device, the subscription information includes an identification of application services available to the gateway device provided by an application service provider;

sending, by the activation manager, the service authentication key and the identification of the application services available to the gateway device;

after the gateway device has received the service authentication key, sending, by the service manager of the gateway device, a gateway authentication certificate request to the activation manager via the secure communication channel; and sending, by the activation manager, a gateway authentication certificate to the gateway device, the gateway authentication certificate representing transfer of the application service provider's trust to the gateway device such that whenever the endpoint device accesses the gateway device the gateway authentication certificate assures the endpoint device that the gateway device is trusted by the application service provider.

25. The method of claim 24, wherein the connection client is a representational state transfer (REST) client, wherein the secure communication channel includes a Hyper-Text Transfer Protocol with Secure Socket Layer (HTTPS) connection, and wherein the service interface module is a web service interface.

26. The method of claim 24, wherein the service interface module provides at least one of a web service interface, a television interface, and a session initiation protocol interface.

27. The method of claim 24, wherein the gateway device further includes a control channel module configured to form a control channel between the gateway device and a designated service management center across the wide area network.

28. The method of claim 27, further comprising establishing the control channel between the gateway device and the designated service management center, the control channel being different than the secure communication channel;

sending, from the gateway device, an authentication request for an application service based on the identified available application services across the control channel to the designated service management center, the request including the service authentication key associated with the application service;

sending the authentication request, including the service authentication key, to the authentication manager;

verifying, by the authentication manager, the service authentication key and that the gateway device status is activated; and thereafter accessing the application service by the gateway device using the verified service authentication key.

29. The method claim 28, further comprising sending, by the service manager of the gateway device, a renewal request across the control channel to the authentication manager to renew the service authentication key.

30. The method of claim 28, further comprising sending, by the service manager of the gateway device, a configuration request for a service configuration update to the designated service management center across the control channel;

receiving, at the gateway device, the service configuration update from the designated service management center across the control channel; and updating a service configuration of the gateway device based on the received service configuration update.

31. The method of claim 28, sending, by the designated service management center, a new service authentication key on a predetermined periodic basis to the gateway device.

32. A method comprising:

providing a gateway device in a non-activated state, wherein the gateway device includes:

a service manager configured to control an activation and authentication process of the gateway device, the service manager further configured to associate an endpoint device and a user of the endpoint device with the gateway device;

a state manager configured to store a state status of the gateway device that is utilized by the service manager in controlling the activation and authentication of the gateway device, wherein the state status is at least one of non-activated, activation pending, activated, and authenticated;

a connection client configured to form a secure communication channel between the gateway device and an activation manager across the wide area network;

a control channel module configured to form a control channel between the gateway device and a designated service management center across the wide area network, the control channel being different than the secure communication channel and be configured for requesting service configuration updates for the gateway device from the designated service management center;

a service interface module in communication with the connection client and configured to interface with the wide area network to form the secure communication channel between the gateway device and the activation manager, the service interface module further configured to provide activation status indications to the endpoint device associated with the gateway device;

assigning to the gateway device a unique serial number, an activation certificate, a private key, and an activation code, wherein the unique serial number, the activation certificate, the private key, and the activation code are all different from each other, wherein the activation certificate is assigned to the gateway device at time of manufacturing and the activation certificate certifies that the gateway device is trusted by the activation manager;

initiating, by the service manager of the gateway device, the activation and authentication process independent of the user of the endpoint device performing any user navigation steps on a user interface associated with either the endpoint device or the gateway device;

sending, by the service manager of the gateway device, a first activation request to the connection client;

forming, by the connection client of the gateway device, the secure communication channel between the gateway device and the activation manager across the wide area network by utilizing the service interface module in response to the first activation request;

sending, by the gateway device, the first activation request to the activation manager via the secure communication channel for activation and authentication of the gateway device independent of the user of the endpoint device performing any user navigation steps on the user interface associated with either the endpoint device or the gateway device, the first activation request including the unique serial number and the activation certificate;

determining by the activation manager, after the sending of the first activation request to the activation manager, that the user of the endpoint device was provided the activation code;

sending, by the activation manager, a request for the activation code to the gateway device via the secure communication channel;

providing an activation status indication on the endpoint device requesting the activation code from the user of the endpoint device;

sending, by the endpoint device associated with the gateway device, the activation code to the service interface module of the gateway device;

sending, by the service manager of the gateway device, a second activation request to the activation manager via the secure communication channel, the second activation request including the unique serial number, the activation certificate, and the activation code received from the endpoint device;

verifying, by the activation manager, the gateway device using the unique serial number, the activation certificate, and the activation code from the second activation request;

sending, by the activation manager, the second activation request to an authentication manager after the gateway device has been verified by the activation manager in order to activate the gateway device;

verifying, by the authentication manager, the gateway device using the unique serial number, the activation certificate, and the activation code from the second activation request;

generating, by the authentication manager, a service authentication key associated with the gateway device after the gateway device has been verified by the activation manager to confirm that the gateway device is activated and authenticated;

storing the service authentication key and an indication that the associated gateway device status is activated in a database, the database being external to the user premises;

sending, by the authentication manager, the service authentication key to the activation manager;

determining a subscription information of the gateway device, the subscription information includes an application service available to the gateway device provided by an application service provider;

sending, by the activation manager, the service authentication key and an identification of the available services to the gateway device;

storing the service authentication key in a storage area on the gateway device, the service authentication key enables authorization for receiving services at the endpoint device being obtained through the gateway device without having to resort to the activation manager and the authentication manager;

updating, by the service manager of the gateway device, the state status of the gateway device to activated after receiving the service authentication key;

after updating the state status of the gateway device to activated, sending, by the service manager of the gateway device, a gateway authentication certificate request to the activation manager via the secure communication channel;

sending, by the activation manager, the gateway authentication certificate request to a certificate server;

verifying, by the certificate server, the gateway device and generating, once verified, a gateway authentication certificate for the gateway device;

sending, by the certificate server, the gateway authentication certificate to the activation manager; and sending, by the activation manager, the gateway authentication certificate to the gateway device, the gateway authentication certificate representing transfer of the application service provider's trust to the gateway device such that whenever the endpoint device accesses the gateway device the gateway authentication certificate assures the endpoint device that the gateway device is trusted by the application service provider.

33. The method of claim 32, wherein sending, by the activation manager, the service authentication key and an identification of the available services to the gateway device includes sending, by the activation manager, the subscription information, including data about the designated service management center, to the gateway device.

34. The method of claim 32, wherein providing the activation status indication on the endpoint device requesting the activation code from the user of the endpoint device occurs prior to the endpoint device sending the activation code to the gateway device, and wherein providing the activation status on the endpoint device occurs independent of the user of the endpoint device invoking any service or navigation requests on the user interface associated with either the endpoint device or the gateway device.

35. The method of claim 32, wherein the connection client is a representational state transfer (REST) client, wherein the secure communication channel includes a Hyper-Text Transfer Protocol with Secure Socket Layer (HTTPS) connection, and wherein the service interface module is a web service interface module.

36. The method of claim 32, wherein the service interface module provides at least one of a web service interface, a television interface, and a session initiation protocol interface.

37. The method of claim 32, further comprising establishing the control channel between the gateway device and the designated service management center, the control channel being different than the secure communication channel;

sending, from the gateway device, an authentication request for the application service across the control channel to the designated service management center, the request including the service authentication key associated with the application service;

sending the authentication request, including the service authentication key, to the authentication manager;

verifying, by the authentication manager, the service authentication key and that the gateway device status is activated; and thereafter accessing the application service by the gateway device using the verified service authentication key.

38. The method claim 37, further comprising sending, by the service manager of the gateway device, a renewal request across the control channel to the authentication manager to renew the service authentication key.

39. The method of claim 37, further comprising sending, by the service manager of the gateway device, a configuration request for a service configuration update to the designated service management center across the control channel;

receiving, at the gateway device, the service configuration update from the designated service management center across the control channel; and updating a service configuration of the gateway device based on the received service configuration update.

40. The method of claim 32, sending, by the designated service management center, a new service authentication key on a predetermined periodic basis to the gateway device.

41. The method of claim 32, wherein generating, by the authentication manager, the service authentication key further comprises generating at least one service key for at least one of web service, voice service, movie service, music service, file-sharing service, file-backup service, gaming service, advertising service, and food-ordering service.

42. The method of claim 32, wherein generating, by the authentication manager, the service authentication key further comprises generating the service authentication key with a validation parameter, the validation parameter specifying a circumstance under which the service key is valid.

* * * * *